(12) United States Patent
Yuan et al.

(10) Patent No.: US 12,219,501 B2
(45) Date of Patent: Feb. 4, 2025

(54) TRANSMIT POWER PRIORITIZATION IN INTER-BAND CARRIER AGGREGATION

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 333 days.

(21) Appl. No.: 17/800,349

(22) PCT Filed: Feb. 25, 2020

(86) PCT No.: PCT/CN2020/076576
§ 371 (c)(1),
(2) Date: Aug. 17, 2022

(87) PCT Pub. No.: WO2021/168648
PCT Pub. Date: Sep. 2, 2021

(65) Prior Publication Data
US 2023/0065671 A1 Mar. 2, 2023

(51) Int. Cl.
*H04W 52/36* (2009.01)
*H04B 1/3827* (2015.01)

(52) U.S. Cl.
CPC ........ *H04W 52/367* (2013.01); *H04B 1/3838* (2013.01)

(58) Field of Classification Search
CPC ............. H04B 1/3838; H04W 52/146; H04W 52/242; H04W 52/281; H04W 52/34; H04W 52/367
See application file for complete search history.

(56) References Cited

U.S. PATENT DOCUMENTS

| 10,667,267 B2 | 5/2020 | Li et al. |
| 11,012,947 B2 | 5/2021 | Damnjanovic et al. |

(Continued)

FOREIGN PATENT DOCUMENTS

| CN | 105992325 A | 10/2016 |
| CN | 109983808 A | 7/2019 |

(Continued)

OTHER PUBLICATIONS

International Search Report and Written Opinion—PCT/CN2020/076576—ISA/EPO—Nov. 3, 2020.

(Continued)

*Primary Examiner* — Nguyen T Vo
(74) *Attorney, Agent, or Firm* — Loza & Loza LLP

(57) ABSTRACT

Aspects of the disclosure relate to inter-band carrier aggregation. A user equipment (UE), for example, may obtain a measured configured maximum UE output power ($P_{UMAX}$) and prioritize aspects of UE transmissions that contribute to $P_{UMAX}$. Prioritization may be based, for example, on band priority, channel priority, service priority, or any combination thereof. The power levels related to the prioritized features may be changed by changing a power management maximum power reduction (P-MPR) of each feature associated with the transmission according to the prioritized order of the features. The UE may determine if an electromagnetic power density exposure level of the UE is at or below a predetermined maximum permissible exposure (MPE) level. The UE may continue to reduce the transmitter output power if the electromagnetic power density exposure level is greater than the predetermined MPE level. Other aspects, embodiments, and features are also claimed and described.

38 Claims, 14 Drawing Sheets

(56) References Cited

U.S. PATENT DOCUMENTS

| | | | |
|---|---|---|---|
| 2011/0319120 A1* | 12/2011 | Chen | H04W 52/367 |
| | | | 455/522 |
| 2016/0345298 A1 | 11/2016 | Frank | |
| 2017/0332333 A1 | 11/2017 | Santhanam et al. | |
| 2018/0139702 A1* | 5/2018 | Ramkumar | H04W 52/16 |
| 2019/0044561 A1 | 2/2019 | Fernando et al. | |
| 2019/0159134 A1 | 5/2019 | Wang et al. | |
| 2019/0253976 A1 | 8/2019 | Pelletier et al. | |
| 2020/0021421 A1 | 1/2020 | Han et al. | |
| 2020/0037254 A1 | 1/2020 | Comsa et al. | |
| 2020/0314771 A1* | 10/2020 | Frank | H04W 52/38 |

FOREIGN PATENT DOCUMENTS

| | | |
|---|---|---|
| CN | 110225575 A | 9/2019 |
| EP | 2696633 A1 | 2/2014 |
| WO | 2011050137 | 4/2011 |
| WO | 2017197096 A1 | 11/2017 |
| WO | 2018118343 | 6/2018 |

OTHER PUBLICATIONS

InterDigital: "NSA and NR—UE Maximum Output Power", R4-1700446, TSG-RAN Working Group 4 (Radio) Meeting #82, 10.4.2.3, Athens, GR, Feb. 13-17, 2017, pp. 1-7.

Nokia., et al., "TP to TR 38.817-01: Power Sharing for LTE-NR Dual Connectivity", 3GPP TSG-RAN WG4 #85, R4-1712481, 3rd Generation Partnership Project (3GPP), Mobile Competence Centre, 650, Route Des Lucioles, F-06921, Sophia-Antipolis Cedex, France, vol. RAN WG4, No. Reno, USA, Nov. 27, 2017-Dec. 1, 2017, Nov. 17, 2017, 2 Pages, XP051374106, Section 3, p. 1-2.

Samsung., et al., "NR Inter-band DC Band Combinations", 3GPP TSG-RAN WG4 Meeting # 88, R4-1809959, 3rd Generation Partnership Project (3GPP), Mobile Competence Centre, 650, Route Des Lucioles, F-06921, Sophia-Antipolis Cedex, France, vol. RAN WG4, No. Gothenburg, SE, Aug. 20, 2018-Aug. 24, 2018, Aug. 10, 2018, 7 Pages, XP051578989, Section 2, p. 4.

Supplementary European Search Report—EP20921073—Search Authority—The Hague—Oct. 16, 2023.

* cited by examiner

TRANSMIT POWER PRIORITIZATION IN INTER-BAND CARRIER AGGREGATION

CROSS-REFERENCE TO RELATED APPLICATION(S)

This application is the U.S. national stage of PCT patent application number PCT/CN2020/076576 filed on Feb. 25, 2020.

TECHNICAL FIELD

The technology discussed below relates generally to wireless communication systems, and more particularly, to transmit power prioritization in inter-band carrier aggregation.

INTRODUCTION

User equipment (UE) radiates electromagnetic power. A maximum permissible exposure (MPE) level should be adhered to. Changes to the maximum output power of the UE may help to control the electromagnetic power density exposure level associated with the UE and may bring the radiated electromagnetic power density to acceptable MPE levels.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

This disclosure relates to inter-band carrier aggregation. A user equipment (UE), for example, may obtain a measured configured maximum UE output power ($P_{UMAX}$) and prioritize aspects of UE transmissions that contribute to $P_{UMAX}$. Prioritization may be based, for example, on band priority, channel priority, service priority, or any combination thereof. The power levels related to the prioritized features may be changed by changing a power management maximum power reduction (P-MPR) of each feature associated with the transmission according to the prioritized order of the features. The UE may determine if an electromagnetic power density exposure level of the UE is at or below a predetermined maximum permissible exposure (MPE) level. The UE may continue to reduce the transmitter output power if the electromagnetic power density exposure level is greater than the predetermined MPE level.

According to one example, a method of wireless communication using inter-band carrier aggregation at a user equipment (UE), may include determining to reduce a value of a measured configured maximum user equipment (UE) output power (PUMAX), determining a priority order in which to change a value of a power management maximum power reduction (P-MPR) of each component carrier f of serving cell c having a non-zero granted transmission power, reducing a transmitter output power of each carrier f of serving cell c having the non-zero granted transmission power according to the determined priority order by increasing a P-MPR of the carrier f of serving cell c, determining an electromagnetic power density exposure level, determining if the electromagnetic power density exposure level is at or below a predetermined maximum permissible exposure (MPE) level, and returning to reducing the transmitter output power if the electromagnetic power density exposure level is greater than the predetermined MPE level.

According to another example, an apparatus for wireless communication using inter-band carrier aggregation at a user equipment (UE), may include means for determining to reduce a value of a measured configured maximum user equipment (UE) output power (PUMAX), means for determining a priority order in which to change a value of a power management maximum power reduction (P-MPR) of each component carrier f of serving cell c having a non-zero granted transmission power, means for reducing a transmitter output power of each carrier f of serving cell c having the non-zero granted transmission power according to the determined priority order by increasing a P-MPR of the carrier f of serving cell c, means for determining an electromagnetic power density exposure level, means for determining if the electromagnetic power density exposure level is at or below a predetermined maximum permissible exposure (MPE) level, and means for returning to reducing the transmitter output power if the electromagnetic power density exposure level is greater than the predetermined MPE level.

According to yet another example, there is described a non-transitory computer-readable medium storing computer-executable code, comprising code for causing a computer to determine to reduce a value of a measured configured maximum user equipment (UE) output power (PUMAX), determine a priority order in which to change a value of a power management maximum power reduction (P-MPR) of each component carrier f of serving cell c having a non-zero granted transmission power, reduce a transmitter output power of each carrier f of serving cell c having the non-zero granted transmission power according to the determined priority order by increasing a P-MPR of the carrier f of serving cell c, determine an electromagnetic power density exposure level, determining if the electromagnetic power density exposure level is at or below a predetermined maximum permissible exposure (MPE) level, and return to reducing the transmitter output power if the electromagnetic power density exposure level is greater than the predetermined MPE level.

According to still another example, there may be described an apparatus for wireless communication, including a processor, a transceiver communicatively coupled to the processor, and a memory communicatively coupled to the processor. According to the example, the processor may be configured to determine to reduce a value of a measured configured maximum user equipment (UE) output power (PUMAX), determine a priority order in which to change a value of a power management maximum power reduction (P-MPR) of each component carrier f of serving cell c having a non-zero granted transmission power, reduce a transmitter output power of each carrier f of serving cell c having the non-zero granted transmission power according to the determined priority order by increasing a P-MPR of the carrier f of serving cell c, determine an electromagnetic power density exposure level, determine if the electromagnetic power density exposure level is at or below a predetermined maximum permissible exposure (MPE) level, and return to reducing the transmitter output power if the electromagnetic power density exposure level is greater than the predetermined MPE level.

According to another aspect, there may be described a method of wireless communication using inter-band carrier aggregation at a user equipment (UE), including determining to reduce a value of a measured configured maximum user equipment (UE) output power (PUMAX), determining a priority order of a plurality of types of uplink (UL) transmissions, assigning a priority value to each type of UL transmission in accordance with the determined priority order, reducing a transmitter output power associated with the given type of UL transmission during the given type of UL transmission by increasing a P-MPR according to the determined priority order, determining an electromagnetic power density exposure level, determining if the electromagnetic power density exposure level is at or below a predetermined maximum permissible exposure (MPE) level, and returning to reducing the transmitter output power if the electromagnetic power density exposure level is greater than the predetermined MPE level.

According to another example, an apparatus may include means for determining to reduce a value of a measured configured maximum user equipment (UE) output power (PUMAX), means for determining a priority order of a plurality of types of uplink (UL) transmissions, means for assigning a priority value to each type of UL transmission in accordance with the determined priority order, means for reducing a transmitter output power associated with the given type of UL transmission during the given type of UL transmission by increasing a P-MPR according to the determined priority order, means for determining an electromagnetic power density exposure level, determining if the electromagnetic power density exposure level is at or below a predetermined maximum permissible exposure (MPE) level, and means for returning to reducing the transmitter output power if the electromagnetic power density exposure level is greater than the predetermined MPE level.

According to yet another example, there is described a non-transitory computer-readable medium storing computer-executable code, comprising code for causing a computer to determine to reduce a value of a measured configured maximum user equipment (UE) output power (PUMAX), determine a priority order of a plurality of types of uplink (UL) transmissions, assign a priority value to each type of UL transmission in accordance with the determined priority order, reduce a transmitter output power associated with the given type of UL transmission during the given type of UL transmission by increasing a P-MPR according to the determined priority order, determine an electromagnetic power density exposure level, determine if the electromagnetic power density exposure level is at or below a predetermined maximum permissible exposure (MPE) level, and returning to reducing the transmitter output power if the electromagnetic power density exposure level is greater than the predetermined MPE level.

According to still another example, there may be described an apparatus for wireless communication, including a processor, a transceiver communicatively coupled to the processor, and a memory communicatively coupled to the processor. According to the example, the processor may be configured to determine to reduce a value of a measured configured maximum user equipment (UE) output power (PUMAX), determine a priority order of a plurality of types of uplink (UL) transmissions, assign a priority value to each type of UL transmission in accordance with the determined priority order, reduce a transmitter output power associated with the given type of UL transmission during the given type of UL transmission by increasing a P-MPR according to the determined priority order, determine an electromagnetic power density exposure level, determine if the electromagnetic power density exposure level is at or below a predetermined maximum permissible exposure (MPE) level, and returning to reducing the transmitter output power if the electromagnetic power density exposure level is greater than the predetermined MPE level.

According to still another aspect, there may be described a method of wireless communication using inter-band carrier aggregation at a user equipment (UE), including determining to reduce a value of a measured configured maximum user equipment (UE) output power (PUMAX), selecting a first UL channel from a first PUCCH group of a PUCCH having a plurality of PUCCH groups and a second UL channel from a second PUCCH group of the PUCCH having the plurality of PUCCH groups, determining if a first service-priority (S-pri) value of the first UL channel is higher than a second S-pri value of the second UL channel, giving a higher priority for transmission to that one of the first UL channel or the second UL channel that has a highest S-pri value, reducing a transmitter output power associated with the higher priority UL channel by increasing a P-MPR associated with the higher priority UL channel, determining an electromagnetic power density exposure level, determining if the electromagnetic power density exposure level is at or below a predetermined maximum permissible exposure (MPE) level, and returning to reducing the transmitter output power if the electromagnetic power density exposure level is greater than the predetermined MPE level.

According to another example, an apparatus may include means for determining to reduce a value of a measured configured maximum user equipment (UE) output power (PUMAX), means for selecting a first UL channel from a first PUCCH group of a PUCCH having a plurality of PUCCH groups and a second UL channel from a second PUCCH group of the PUCCH having the plurality of PUCCH groups, means for determining if a first service-priority (S-pri) value of the first UL channel is higher than a second S-pri value of the second UL channel, means for giving a higher priority for transmission to that one of the first UL channel or the second UL channel that has a highest S-pri value, means for reducing a transmitter output power associated with the higher priority UL channel by increasing a P-MPR associated with the higher priority UL channel, means for determining an electromagnetic power density exposure level, means for determining if the electromagnetic power density exposure level is at or below a predetermined maximum permissible exposure (MPE) level, and means for returning to reducing the transmitter output power if the electromagnetic power density exposure level is greater than the predetermined MPE level.

According to yet another example, there is described a non-transitory computer-readable medium storing computer-executable code, comprising code for causing a computer to determine to reduce a value of a measured configured maximum user equipment (UE) output power (PUMAX), select a first UL channel from a first PUCCH group of a PUCCH having a plurality of PUCCH groups and a second UL channel from a second PUCCH group of the PUCCH having the plurality of PUCCH groups, determine if a first service-priority (S-pri) value of the first UL channel is higher than a second S-pri value of the second UL channel, give a higher priority for transmission to that one of the first UL channel or the second UL channel that has a highest S-pri value, reduce a transmitter output power associated with the higher priority UL channel by increasing a P-MPR associated with the higher priority UL channel, determine an electromagnetic power density exposure level, determine if the electromagnetic power density exposure level is at or below a predetermined maximum permissible exposure (MPE) level, and return to reducing the transmitter output power if the electromagnetic power density exposure level is greater than the predetermined MPE level.

According to still another example, there may be described an apparatus for wireless communication, including a processor, a transceiver communicatively coupled to the processor, and a memory communicatively coupled to the processor. According to the example, the processor may be configured to determine to reduce a value of a measured configured maximum user equipment (UE) output power (PUMAX), select a first UL channel from a first PUCCH group of a PUCCH having a plurality of PUCCH groups and a second UL channel from a second PUCCH group of the PUCCH having the plurality of PUCCH groups, determine if a first service-priority (S-pri) value of the first UL channel is higher than a second S-pri value of the second UL channel, give a higher priority for transmission to that one of the first UL channel or the second UL channel that has a highest S-pri value, reduce a transmitter output power associated with the higher priority UL channel by increasing a P-MPR associated with the higher priority UL channel, determine an electromagnetic power density exposure level, determine if the electromagnetic power density exposure level is at or below a predetermined maximum permissible exposure (MPE) level, and return to reducing the transmitter output power if the electromagnetic power density exposure level is greater than the predetermined MPE level.

According to still another aspect, there may be described a method of wireless communication using inter-band carrier aggregation at a user equipment (UE), including determining to reduce a value of a measured configured maximum user equipment (UE) output power (PUMAX), selecting a first UL channel from a first PUCCH group of a PUCCH having a plurality of PUCCH groups and a second UL channel from a second PUCCH group of the PUCCH having the plurality of PUCCH groups, determining if a first channel-priority (C-pri) value of the first UL channel is higher than a second C-pri value of the second UL channel, giving a higher priority for transmission to that one of the first UL channel or the second UL channel that has a highest C-pri value, reducing a transmitter output power associated with the higher priority UL channel by increasing a P-MPR associated with the higher priority UL channel, determining an electromagnetic power density exposure level, determining if the electromagnetic power density exposure level is at or below a predetermined maximum permissible exposure (MPE) level, and returning to reducing the transmitter output power if the electromagnetic power density exposure level is greater than the predetermined MPE level.

According to another example, an apparatus may include means for determining to reduce a value of a measured configured maximum user equipment (UE) output power (PUMAX), means for selecting a first UL channel from a first PUCCH group of a PUCCH having a plurality of PUCCH groups and a second UL channel from a second PUCCH group of the PUCCH having the plurality of PUCCH groups, means for determining if a first channel-priority (C-pri) value of the first UL channel is higher than a second C-pri value of the second UL channel, means for giving a higher priority for transmission to that one of the first UL channel or the second UL channel that has a highest C-pri value, means for reducing a transmitter output power associated with the higher priority UL channel by increasing a P-MPR associated with the higher priority UL channel, means for determining an electromagnetic power density exposure level, means for determining if the electromagnetic power density exposure level is at or below a predetermined maximum permissible exposure (MPE) level, and means for returning to reducing the transmitter output power if the electromagnetic power density exposure level is greater than the predetermined MPE level.

According to yet another example, there is described a non-transitory computer-readable medium storing computer-executable code, comprising code for causing a computer to determine to reduce a value of a measured configured maximum user equipment (UE) output power (PUMAX), select a first UL channel from a first PUCCH group of a PUCCH having a plurality of PUCCH groups and a second UL channel from a second PUCCH group of the PUCCH having the plurality of PUCCH groups, determine if a first channel-priority (C-pri) value of the first UL channel is higher than a second C-pri value of the second UL channel, give a higher priority for transmission to that one of the first UL channel or the second UL channel that has a highest C-pri value, reduce a transmitter output power associated with the higher priority UL channel by increasing a P-MPR associated with the higher priority UL channel, determine an electromagnetic power density exposure level, determine if the electromagnetic power density exposure level is at or below a predetermined maximum permissible exposure (MPE) level, and return to reducing the transmitter output power if the electromagnetic power density exposure level is greater than the predetermined MPE level.

According to still another example, there may be described an apparatus for wireless communication, including a processor, a transceiver communicatively coupled to the processor, and a memory communicatively coupled to the processor. According to the example, the processor may be configured to determine to reduce a value of a measured configured maximum user equipment (UE) output power (PUMAX), select a first UL channel from a first PUCCH group of a PUCCH having a plurality of PUCCH groups and a second UL channel from a second PUCCH group of the PUCCH having the plurality of PUCCH groups, determine if a first channel-priority (C-pri) value of the first UL channel is higher than a second C-pri value of the second UL channel, give a higher priority for transmission to that one of the first UL channel or the second UL channel that has a highest C-pri value, reduce a transmitter output power associated with the higher priority UL channel by increasing a P-MPR associated with the higher priority UL channel, determine an electromagnetic power density exposure level, determine if the electromagnetic power density exposure level is at or below a predetermined maximum permissible exposure (MPE) level, and return to reducing the transmitter output power if the electromagnetic power density exposure level is greater than the predetermined MPE level.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
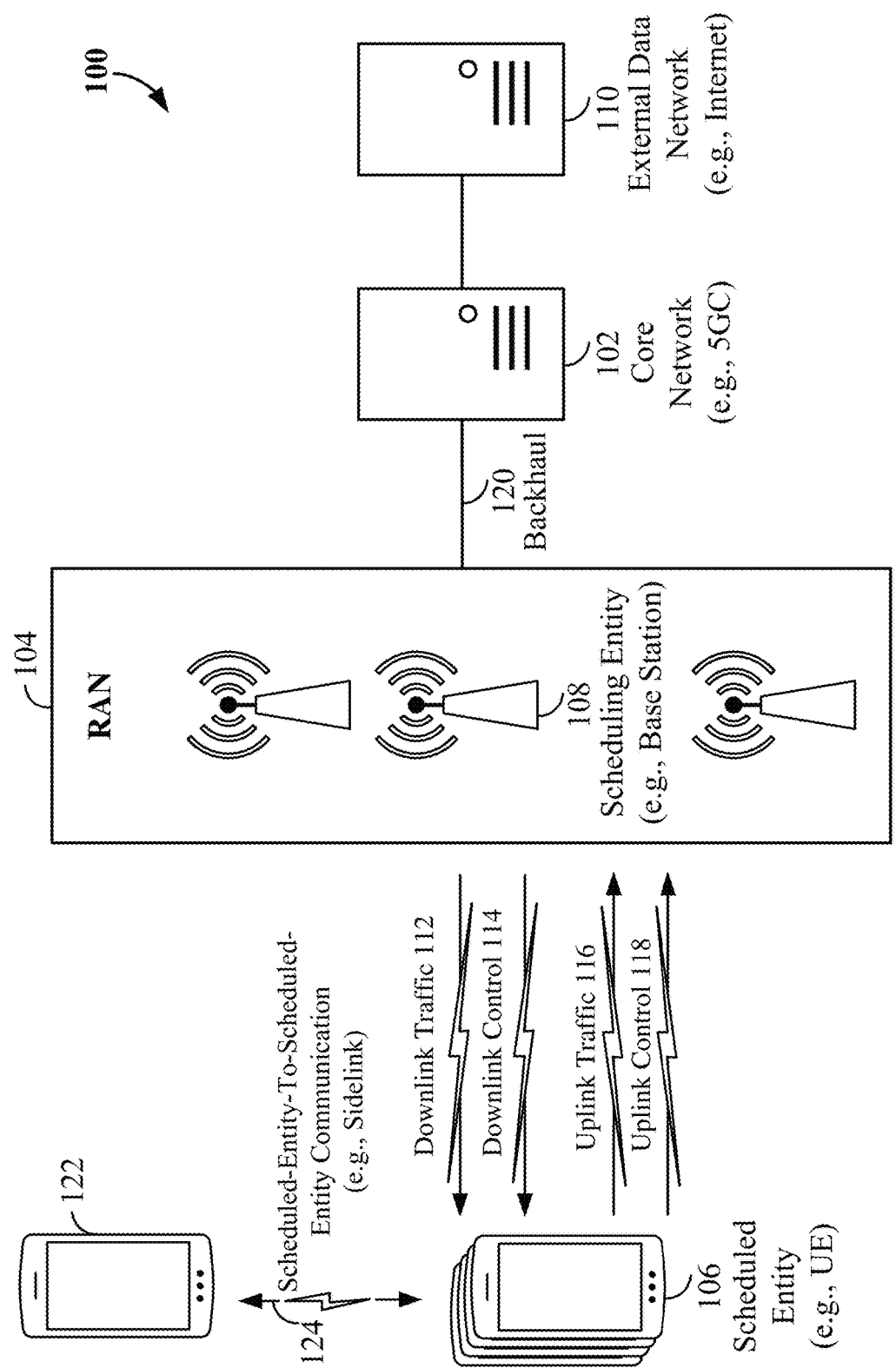
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
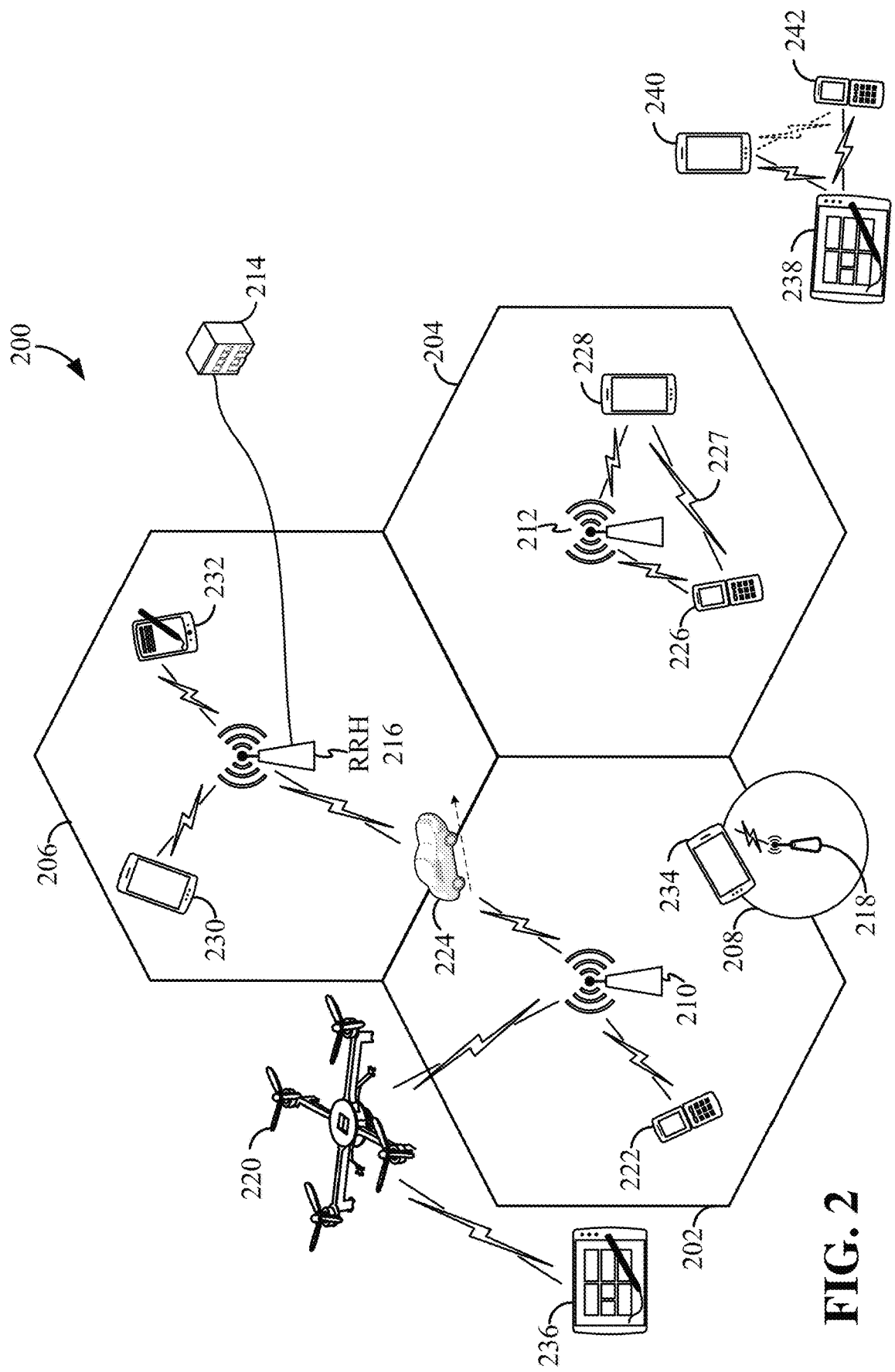
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In general, a UE may function as a scheduling entity or scheduled entity a sidelink network, such as a device-to-device (D2D), peer-to-peer (P2P), vehicle-to-vehicle (V2V) network, vehicle-to-everything (V2X) network, a mesh network, and/or other suitable sidelink network configuration. In a mesh network example, UEs 240 and 242 may optionally communicate directly with one another in addition to communicating with the scheduling entity 238.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 3:
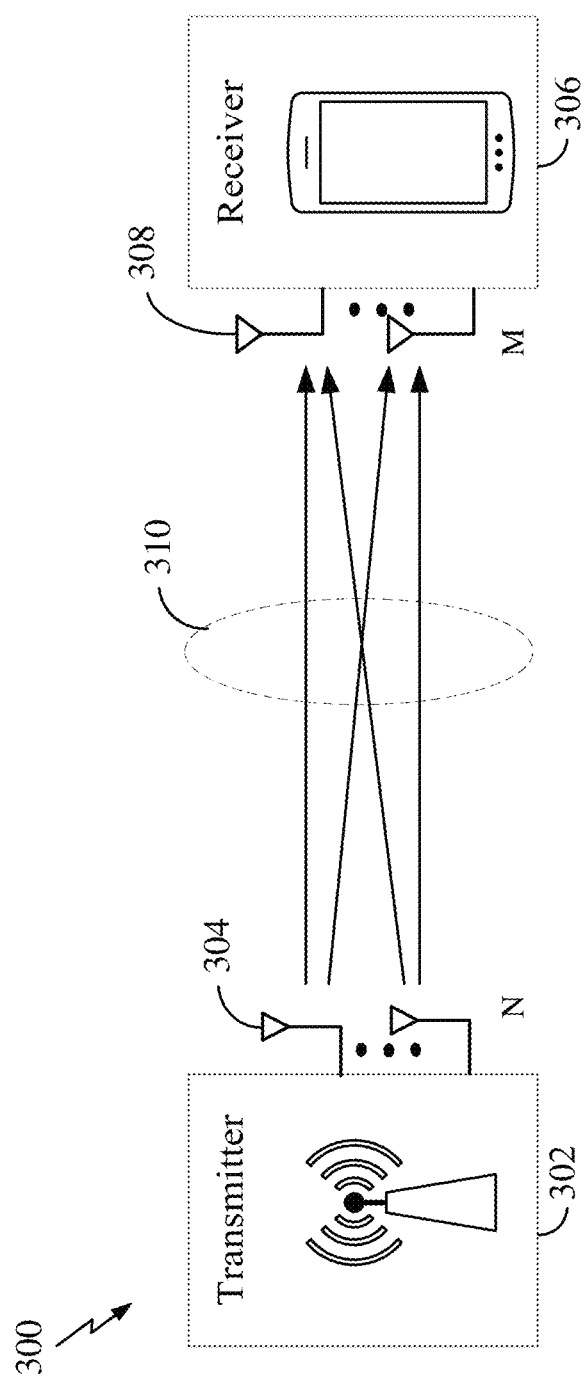
FIG. 3 is a block diagram illustrating a wireless communication system supporting multiple-input multiple-output (MIMO) communication.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-plus-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit a channel state information-reference signal (CSI-RS) with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each subframe 402 (e.g., a 1 ms subframe) may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
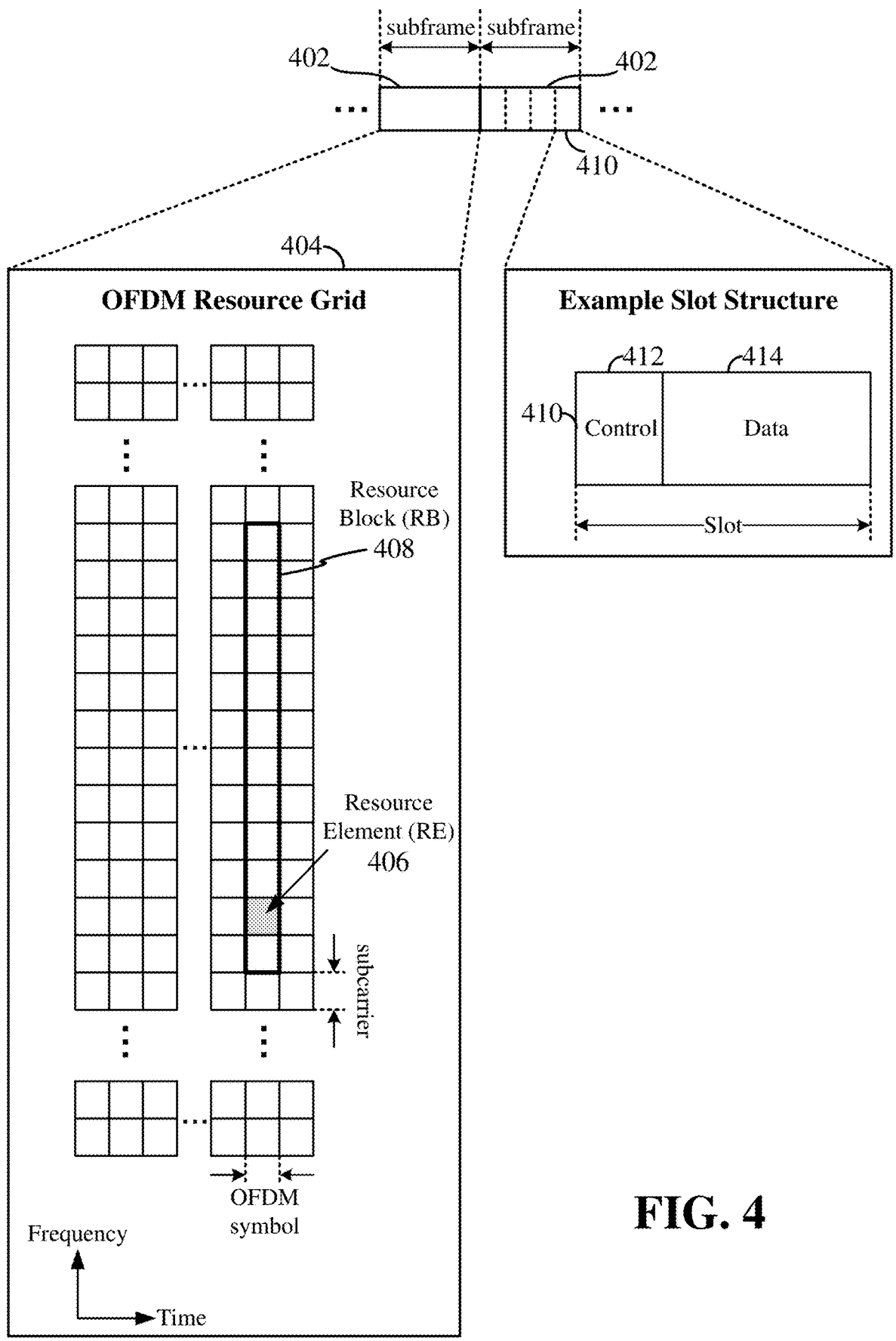
FIG. 4 is a schematic illustration of an organization of wireless resources in an air interface utilizing orthogonal frequency divisional multiplexing (OFDM) according to some embodiments.

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry DL control information 114 including one or more DL control channels that generally carry information originating from higher layers, such as a physical broadcast channel (PBCH), a physical downlink control channel (PDCCH), etc., to one or more scheduled entities 106. In addition, DL REs may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

The synchronization signals PSS and SSS (collectively referred to as SS), and in some examples, the PBCH, may be transmitted in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other non-limiting examples may utilize greater or fewer than two synchronization signals; may include one or more supplemental channels in addition to the PBCH; may omit a PBCH; and/or may utilize nonconsecutive symbols for an SS block, within the scope of the present disclosure.

The PDCCH may carry downlink control information (DCI) for one or more UEs in a cell. This can include, but is not limited to, power control commands, scheduling information, a grant, and/or an assignment of REs for DL and UL transmissions.

In an UL transmission, a transmitting device (e.g., a scheduled entity 106) may utilize one or more REs 406 to carry UL control information 118 (UCI). The UCI can originate from higher layers via one or more UL control channels, such as a physical uplink control channel (PUCCH), a physical random access channel (PRACH), etc., to the scheduling entity 108. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions.

UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. This system information may be provided utilizing minimum system information (MSI), and other system information (OSI). The MSI may be periodically broadcast over the cell to provide the most basic information required for initial cell access, and for acquiring any OSI that may be broadcast periodically or sent on-demand. In some examples, the MSI may be provided over two different downlink channels. For example, the PBCH may carry a master information block (MIB), and the PDSCH may carry a system information block type 1 (SIB1). In the art, SIB1 may be referred to as the remaining minimum system information (RMSI).

OSI may include any SI that is not broadcast in the MSI. In some examples, the PDSCH may carry a plurality of SIBs, not limited to SIB1, discussed above. Here, the OSI may be provided in these SIBs, e.g., SIB2 and above.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 5:
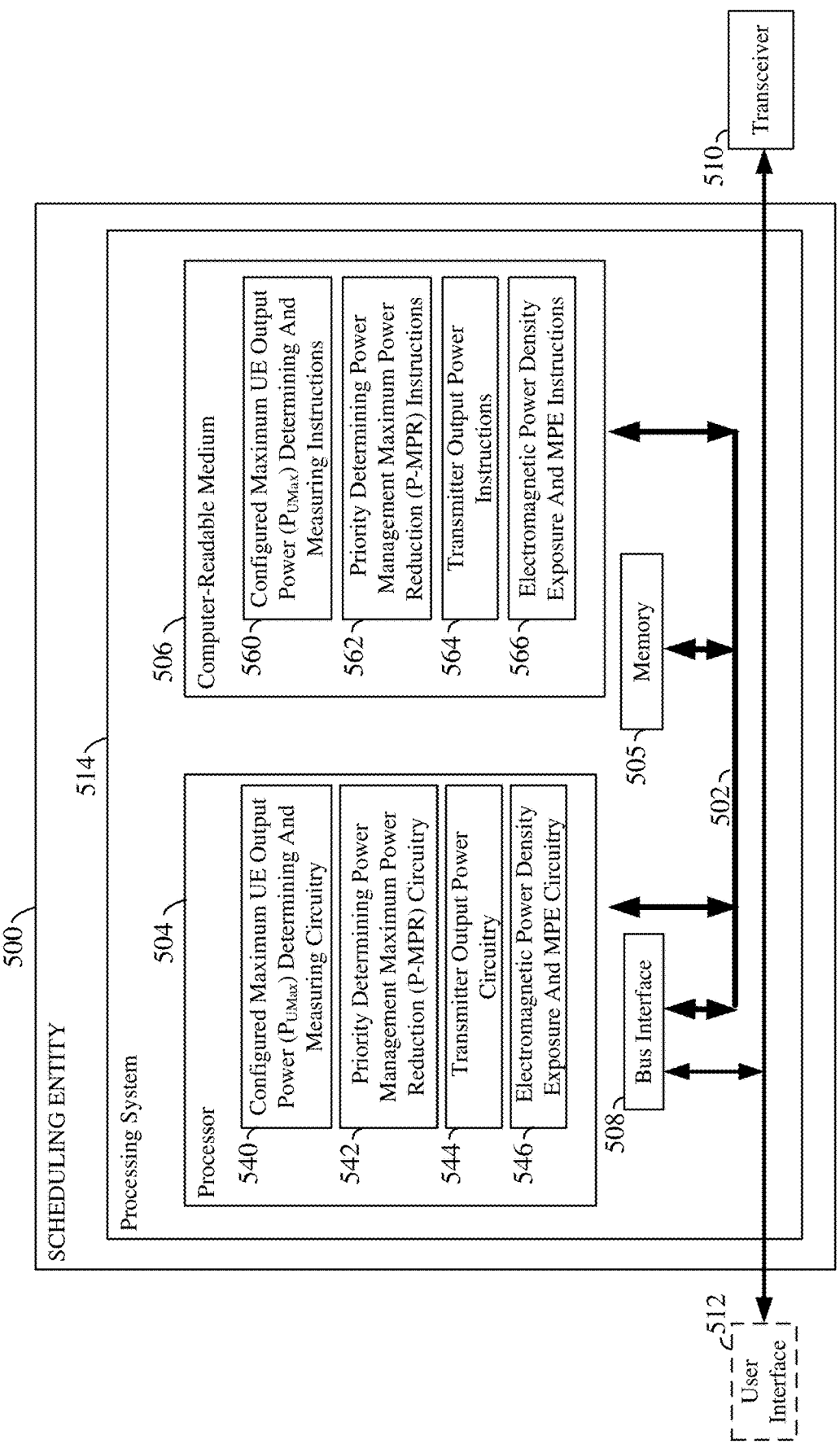
FIG. 5 is a block diagram conceptually illustrating an example of a hardware implementation for a scheduling entity according to some aspects of the disclosure.

FIG. 5 is a block diagram illustrating an example of a hardware implementation of a scheduling entity 500 employing a processing system 514. For example, the scheduling entity 500 may be a user equipment (UE) as illustrated in any one or more of FIGS. 1, 2, 3, and/or 8. In another example, the scheduling entity 500 may be a base station (e.g., a network access node, an eNB, or a gNB) as illustrated in any one or more of FIGS. 1, 2, 3 and/or 8.

The scheduling entity 500 may be implemented with a processing system 514 that includes one or more processors 504. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 500 may be configured to perform any one or more of the functions described herein. That is, the processor 504, as utilized in a scheduling entity 500, may be used to implement any one or more of the processes described below and illustrated, for example, in FIGS. 9-14.

In this example, the processing system 514 may be implemented with a bus architecture, represented generally by the bus 502. The bus 502 may include any number of interconnecting buses and bridges depending on the specific application of the processing system 514 and the overall design constraints. The bus 502 communicatively couples together various circuits including one or more processors (represented generally by the processor 504), a memory 505, and computer-readable media (represented generally by the computer-readable medium 506). The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a communication interface or means for communicating with various other apparatus over a transmission medium. Depending upon the nature of the apparatus, a user interface 512 (e.g., keypad, display, speaker, microphone, joystick) may also be provided. Of course, such a user interface 512 is optional, and may be omitted in some examples, such as a base station.

In some aspects of the disclosure, the processor 504 may include configured maximum UE output power ($P_{UMAX}$) determining and measuring circuitry 540 configured for various functions, including, for example, determining to reduce a value of a measured configured maximum user equipment (UE) output power ($P_{UMAX}$). For example, the configured maximum UE output power ($P_{UMAX}$) determining and measuring circuitry 540 may be configured to implement one or more of the functions described below in relation to FIG. 9, including, e.g., block 902, FIG. 10, including, e.g., block 1002, FIG. 11, including, e.g., block 1102, FIG. 12, including, e.g., block 1202, FIG. 13, including, e.g., block 1302, and FIG. 14, including, e.g., block 1402.

In some aspects of the disclosure, the processor 504 may include priority determining power management maximum power reduction (P-MPR) circuitry 542 configured for various functions, including, for example, determining a priority order in which to change a value of a power management maximum power reduction (P-MPR) of each component carrier f of serving cell c having a non-zero granted transmission power. For example, the priority determining power management maximum power reduction (P-MPR) circuitry 542 may be configured to implement one or more of the functions described below in relation to FIG. 9, including, e.g., block 904, FIG. 10, including, e.g., block 1004, FIG. 11, including, e.g., block 1106, FIG. 12, including, e.g., block 1206, FIG. 13, including, e.g., block 1306, and FIG. 14, including, e.g., block 1406.

In some aspects of the disclosure, the processor 504 may include transmitter output power circuitry 544 configured for various functions, including, for example, reducing a transmitter output power of each carrier f of serving cell c having the non-zero granted transmission power according to the determined priority order by increasing a P-MPR of the carrier f of serving cell c. For example, the transmitter output power circuitry 544 may be configured to implement one or more of the functions described below in relation to FIG. 9, including, e.g., block 906, FIG. 10, including, e.g., block 1008, FIG. 11, including, e.g., block 1112, and FIG. 12, including, e.g., block 1212.

In some aspects of the disclosure, the processor 504 may include electromagnetic power density exposure and MPE circuitry 546 configured for various functions, including, for example, determining an electromagnetic power density exposure level, at the scheduling entity 500 (e.g., the UE), and determining if the electromagnetic power density exposure level is at or below a predetermined maximum permissible exposure (MPE) level. For example, the electromagnetic power density exposure and MPE circuitry 546 may be configured to implement one or more of the functions described below in relation to FIG. 9, including, e.g., blocks 908 and 910, FIG. 10, including, e.g., blocks 1010 and 1012, FIG. 11, including, e.g., blocks 1114 and 1116, and FIG. 12, including, e.g., blocks 1214 and 1216.

The processor 504 is responsible for managing the bus 502 and general processing, including the execution of software stored on the computer-readable medium 506. The software, when executed by the processor 504, causes the processing system 514 to perform the various functions described below for any particular apparatus. The computer-readable medium 506 and the memory 505 may also be used for storing data that is manipulated by the processor 504 when executing software.

One or more processors 504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506. The computer-readable medium 506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 506 may reside in the processing system 514, external to the processing system 514, or distributed across multiple entities including the processing system 514. The computer-readable medium 506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 506 may include configured maximum UE output power ($P_{UMAX}$) determining and measuring software configured for various functions, including, for example, determining to reduce a value of a measured configured maximum user equipment (UE) output power ($P_{UMAX}$). For example, the configured maximum UE output power ($P_{UMAX}$) determining and measuring software may be configured to implement one or more of the functions described above in relation to FIG. 9, including, e.g., block 902, FIG. 10, including, e.g., block 1002, FIG. 11, including, e.g., block 1102, and FIG. 12, including, e.g., block 1202.

In one or more examples, the computer-readable storage medium 506 may include priority determining power management maximum power reduction (P-MPR) software configured for various functions, including, for example, determining a priority order in which to change a value of a power management maximum power reduction (P-MPR) of each component carrier f of serving cell c having a non-zero granted transmission power. For example, the priority determining power management maximum power reduction (P-MPR) software may be configured to implement one or more of the functions described below in relation to FIG. 9, including, e.g., block 904, FIG. 10, including, e.g., block 1004, FIG. 11, including, e.g., block 1104, and FIG. 12, including, e.g., block 1204.

In one or more examples, the computer-readable storage medium 506 may include transmitter output power software configured for various functions, including, for example, reducing a transmitter output power of each carrier f of serving cell c having the non-zero granted transmission power according to the determined priority order by increasing a P-MPR of the carrier f of serving cell c. For example, the transmitter output power software may be configured to implement one or more of the functions described below in relation to FIG. 9, including, e.g., block 906, FIG. 10, including, e.g., block 1008, FIG. 11, including, e.g., block 1112, and FIG. 12, including, e.g., block 1212.

In one or more examples, the computer-readable storage medium 506 may include electromagnetic power density exposure and MPE software configured for various functions, including, for example, determining an electromagnetic power density exposure level, at the scheduling entity 500 (e.g., the UE), and determining if the electromagnetic power density exposure level is at or below a predetermined maximum permissible exposure (MPE) level. For example, the electromagnetic power density exposure and MPE software may be configured to implement one or more of the functions described below in relation to FIG. 9, including, e.g., blocks 908 and 910, FIG. 10, including, e.g., blocks 1010 and 1012, FIG. 11, including, e.g., blocks 1114 and 1116, and FIG. 12, including, e.g., blocks 1214 and 1216.

Figure 6:
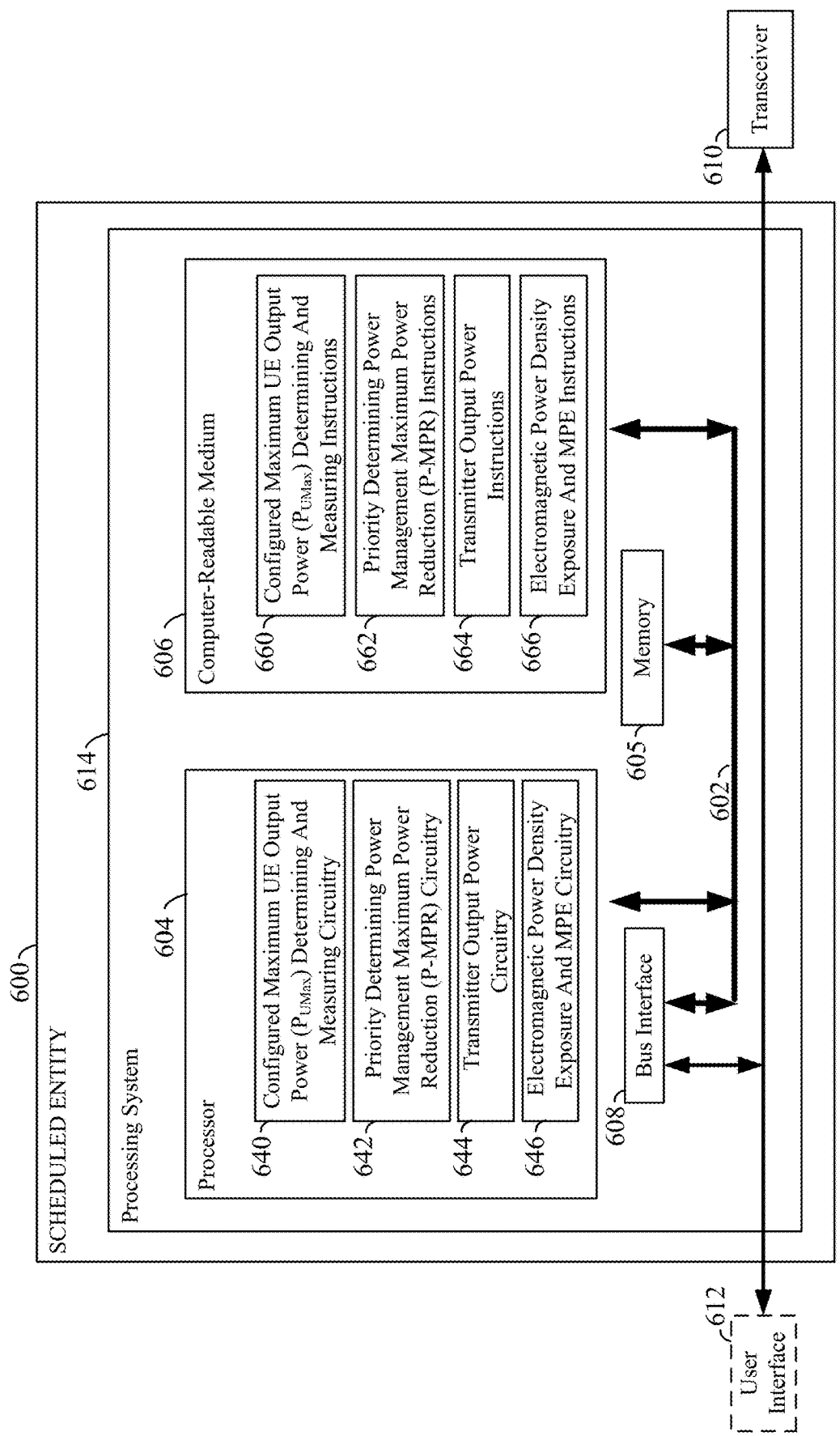
FIG. 6 is a block diagram conceptually illustrating an example of a hardware implementation for a scheduled entity according to some aspects of the disclosure.

FIG. 6 is a conceptual diagram illustrating an example of a hardware implementation for an exemplary scheduled entity 600 employing a processing system 614. In accordance with various aspects of the disclosure, an element, or any portion of an element, or any combination of elements may be implemented with a processing system 614 that includes one or more processors 604. For example, the scheduled entity 600 may be a user equipment (UE) as illustrated in any one or more of FIGS. 1, 2, 3, and/or 8.

The processing system 614 may be substantially the same as the processing system 514 illustrated in FIG. 5, including a bus interface 608, a bus 602, memory 605, a processor 604, and a computer-readable medium 606. Furthermore, the scheduled entity 600 may include a user interface 612 and a transceiver 610 substantially similar to those described above in FIG. 5. That is, the processor 604, as utilized in a scheduled entity 600, may be used to implement any one or more of the processes described below and illustrated, for example, in FIGS. 9-14.

In some aspects of the disclosure, the processor 604 may include configured maximum UE output power ($P_{UMAX}$) determining and measuring circuitry 640 configured for various functions, including, for example, determining to reduce a value of a measured configured maximum user equipment (UE) output power ($P_{UMAX}$). For example, the configured maximum UE output power ($P_{UMAX}$) determining and measuring circuitry 640 may be configured to implement one or more of the functions described below in relation to FIG. 9, including, e.g., block 902, FIG. 10, including, e.g., block 1002, FIG. 11, including, e.g., block 1102, FIG. 12, including, e.g., block 1202, FIG. 13, including, e.g., block 1302, and FIG. 14, including, e.g., block 1402.

In some aspects of the disclosure, the processor 604 may include priority determining power management maximum power reduction (P-MPR) circuitry 642 configured for various functions, including, for example, determining a priority order in which to change a value of a power management maximum power reduction (P-MPR) of each component carrier f of serving cell c having a non-zero granted transmission power. For example, the priority determining power management maximum power reduction (P-MPR) circuitry 642 may be configured to implement one or more of the functions described below in relation to FIG. 9, including, e.g., block 904, FIG. 10, including, e.g., block 1004, FIG. 11, including, e.g., block 1104, FIG. 12, including, e.g., block 1204, FIG. 13, including, e.g., block 1306, and FIG. 14, including, e.g., block 1406.

In some aspects of the disclosure, the processor 604 may include transmitter output power circuitry 644 configured for various functions, including, for example, reducing a transmitter output power of each carrier f of serving cell c having the non-zero granted transmission power according to the determined priority order by increasing a P-MPR of the carrier f of serving cell c. For example, the transmitter output power circuitry 644 may be configured to implement one or more of the functions described below in relation to FIG. 9, including, e.g., block 906, FIG. 10, including, e.g., block 1008, FIG. 11, including, e.g., block 1112, and FIG. 12, including, e.g., block 1212.

In some aspects of the disclosure, the processor 604 may include electromagnetic power density exposure and MPE circuitry 646 configured for various functions, including, for example, determining an electromagnetic power density exposure level, of the scheduled entity 600 (e.g., the UE), and determining if the electromagnetic power density exposure level is at or below a predetermined maximum permissible exposure (MPE) level. For example, the electromagnetic power density exposure and MPE circuitry 646 may be configured to implement one or more of the functions described below in relation to FIG. 9, including, e.g., blocks 908 and 910, FIG. 10, including, e.g., blocks 1010 and 1012, FIG. 11, including, e.g., blocks 1114 and 1116, and FIG. 12, including, e.g., blocks 1214 and 1216.

In one or more examples, the computer-readable storage medium 606 may include configured maximum UE output power ($P_{UMAX}$) determining and measuring software configured for various functions, including, for example, determining to reduce a value of a measured configured maximum user equipment (UE) output power ($P_{UMAX}$). For example, the configured maximum UE output power ($P_{UMAX}$) determining and measuring software may be configured to implement one or more of the functions described above in relation to FIG. 9, including, e.g., block 902, FIG. 10, including, e.g., block 1002, FIG. 11, including, e.g., block 1102, and FIG. 12, including, e.g., block 1202.

In one or more examples, the computer-readable storage medium 606 may include priority determining power management maximum power reduction (P-MPR) software configured for various functions, including, for example, determining a priority order in which to change a value of a power management maximum power reduction (P-MPR) of each component carrier f of serving cell c having a non-zero granted transmission power. For example, the priority determining power management maximum power reduction (P-MPR) software may be configured to implement one or more of the functions described below in relation to FIG. 9, including, e.g., block 904, FIG. 10, including, e.g., block 1004, FIG. 11, including, e.g., block 1104, and FIG. 12, including, e.g., block 1204.

In one or more examples, the computer-readable storage medium 606 may include transmitter output power software configured for various functions, including, for example, reducing a transmitter output power of each carrier f of serving cell c having the non-zero granted transmission power according to the determined priority order by increasing a P-MPR of the carrier f of serving cell c. For example, the transmitter output power software may be configured to implement one or more of the functions described below in relation to FIG. 9, including, e.g., block 906, FIG. 10, including, e.g., block 1008, FIG. 11, including, e.g., block 1112, and FIG. 12, including, e.g., block 1212.

In one or more examples, the computer-readable storage medium 606 may include electromagnetic power density exposure and MPE software configured for various functions, including, for example, determining an electromagnetic power density exposure level, at the scheduled entity 600 (e.g., the UE), and determining if the electromagnetic power density exposure level is at or below a predetermined maximum permissible exposure (MPE) level. For example, the electromagnetic power density exposure and MPE software may be configured to implement one or more of the functions described below in relation to FIG. 9, including, e.g., blocks 908 and 910, FIG. 10, including, e.g., blocks 1010 and 1012, FIG. 11, including, e.g., blocks 1114 and 1116, and FIG. 12, including, e.g., blocks 1214 and 1216.

Carrier aggregation may be used to increase bandwidth for downlink and uplink traffic between a scheduling entity (e.g., a base station, a network access node, an eNB, or a gNB) and a user equipment (UE) (e.g., a scheduled entity). Carrier aggregation may be implemented in both frequency division duplex (FDD) and time division duplex (TDD) communications. In carrier aggregation, the overall signal may include contributions from a plurality of component carriers. According to some aspects, component carriers may have a bandwidth of 1, 3, 4, 5, 10, 15, or 20 MHz. According to some aspects, up to five component carriers may be aggregated resulting in a maximum possible aggregated bandwidth of 100 MHz.

A transmitter (e.g., a transmitter of a scheduling entity or a UE (or scheduled entity)) may use various types of carrier aggregation. Intra-band contiguous carrier aggregation employs contiguous component carriers arranged within the same frequency band (e.g., an 3GPP LTE or NR frequency band). Intra-band non-contiguous carrier aggregation employs non-contiguous (e.g., spaced apart) component carriers within the same frequency band. Inter-band non-contiguous carrier aggregation employs one or more component carriers in a first frequency band and one or more other component carriers in a second frequency band, different from the first frequency band.

In one implementation of carrier aggregation, one serving cell may be defined per component carrier. Because different frequencies of different component carriers may experience different pathlosses (especially in inter-band non-contiguous type carrier aggregation where the various component carriers may be spaced apart from each other by a gaps in frequency between the first and second frequency bands) each component carrier may experience a pathloss that is different from the other component carriers of the aggregated carrier. Accordingly, the sizes of the various serving cell coverage areas may change based on pathloss of a given component carrier. Additionally, or alternatively, one (or more) component carriers may be transmitted at a power level that is different from the remaining component carriers of the aggregated carrier, which also affects the sizes of the various serving cell coverage areas. Accordingly, the sizes of the various serving cell coverage areas may change based on pathloss and/or transmitted power level.

In an aggregated carrier, a certain one of the various serving cells may be designated as a primary serving cell (PSC) and each remaining serving cell may be designated as a secondary serving cell (SC). It is noted that there may be zero, one, or more secondary serving cells associated with a given primary serving cell. Primary serving cells may be served by a primary component carrier (PCC) and each secondary serving cell may be served by secondary component carrier (SCC). According to one aspect, a radio resource control (RRC) connection is handled by the primary serving cell, which is served by the primary component carrier (e.g., DL PCC or UL PCC).

According to one aspect, a scheduling entity and/or a UE may determine to change a transmitted power level of at least one component carrier from a present transmitted power level to a first determined power level to ensure that the electromagnetic power density exposure due to uplink transmission from the UE do not exceed a maximum permissible exposure (MPE) level. Electromagnetic power density and MPE are given milliwatts per unit area, such as mW/cm$^2$.

When a scheduling entity determines to change the transmitted power level, the scheduling entity may send an instruction in an RRC message. The RRC message may be transported using a primary component carrier of a primary serving cell. Responsive to the instructions, or based on its own determination, the UE may adjust the transmit output power of the at least one component carrier to change the transmitted power level to the first determined power level. The first determined power level may be given as an absolute value (e.g., change transmitted power level to −10 dBm) or a relative value (e.g., change transmitted power level by −2 dB). Another way to change the transmitted power level of a UE is to change a power management maximum power reduction (P-MPR) of a UE. The power management UE maximum power reduction for component carrier f of serving cell c as used in carrier aggregation may be abbreviated as P-MPR$_{f,c}$.

Figure 7A:
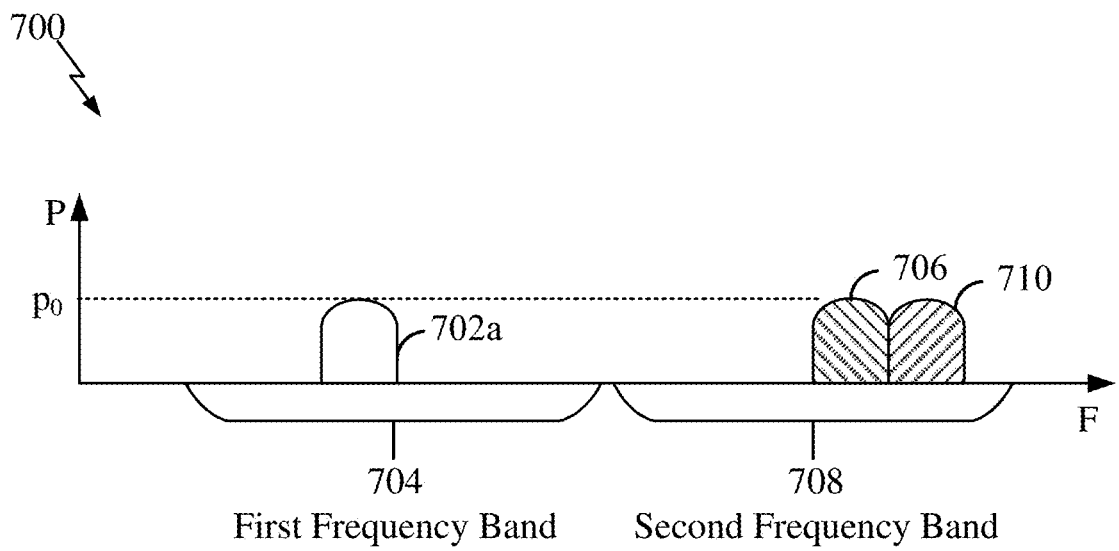
FIG. 7A and FIG. 7B are graphic representations of inter-band, non-contiguous carrier aggregation 700 in accordance with some aspects of the disclosure.
Figure 7B:
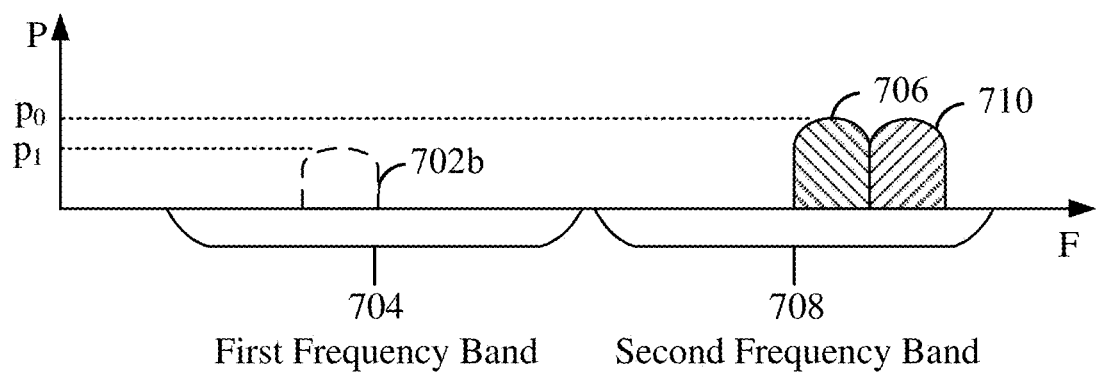

FIG. 7A and FIG. 7B are graphic representations of inter-band, non-contiguous carrier aggregation 700 in accordance with some aspects of the disclosure. FIG. 7A and FIG. 7B depict the same three component carriers. A first component carrier 702a is within a first frequency band 704. A second component carrier 706 is within a second frequency band 708. A third component carrier 710 is also within the second frequency band 708. The second component carrier 706 and the third component carrier 710 are contiguous. The first component carrier 702a and the contiguous second component carrier 706 and third component carrier 710 are not contiguous.

Figure 8:
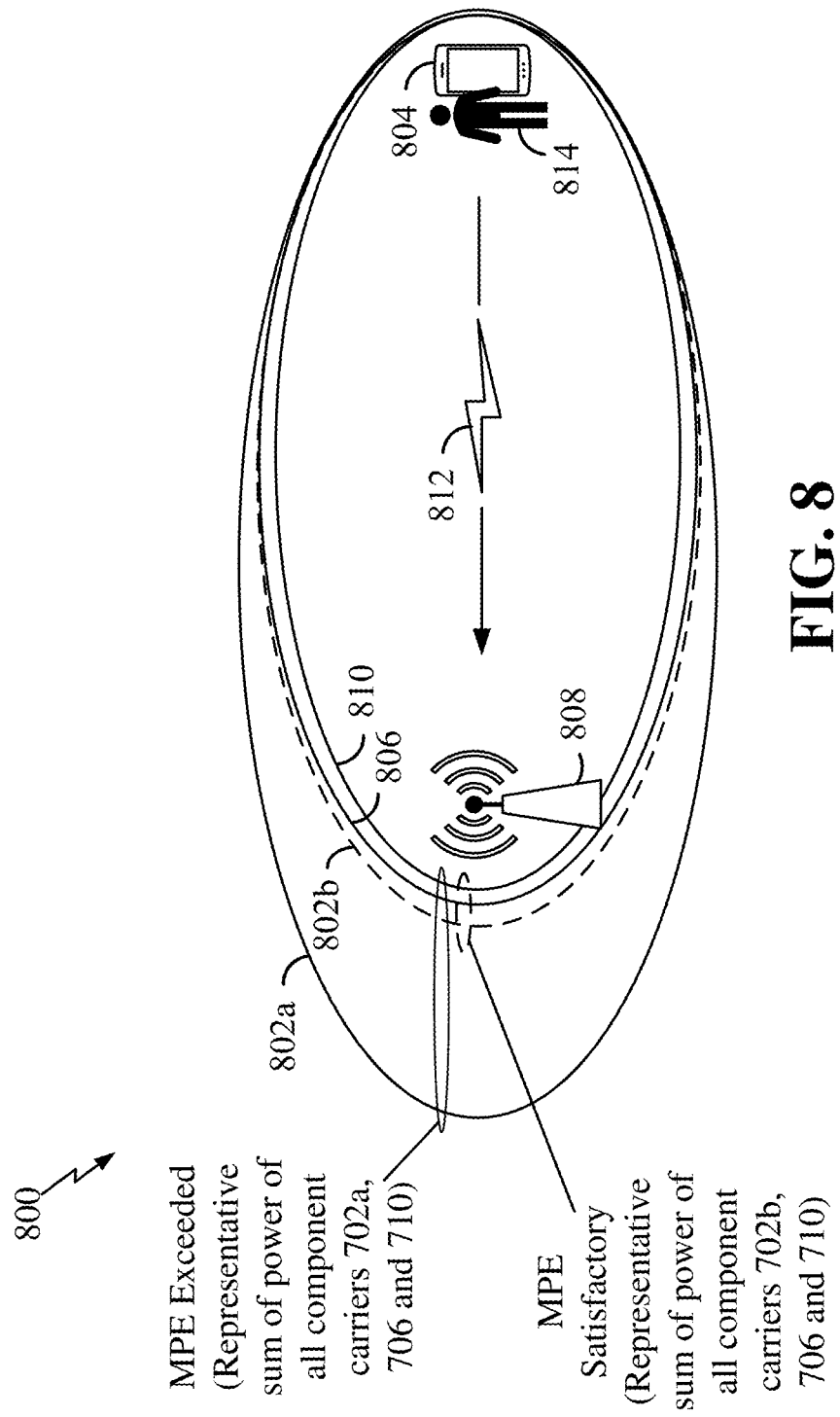
FIG. 8 is a schematic illustration of a user equipment transmitting an uplink transmission to a scheduling entity in accordance with some aspects of the disclosure.

In FIG. 7A and FIG. 7B, the first component carrier 702a, the second component carrier 706, and third component carrier 710 are transmitted from a UE (e.g., UE 804 of FIG. 8) as uplink transmissions (e.g., uplink to a scheduling entity 808 in FIG. 8). Examples of uplink transmissions may include at least one of: a physical random access channel (PRACH) transmission, a physical uplink control channel (PUCCH) transmission, a physical uplink shared channel (PUSCH) transmission, or a sounding reference signal (SRS) transmission.

In FIG. 7A, for exemplary and non-limiting purposes, the transmission power levels of the first component carrier 702a, the second component carrier 706, and third component carrier 710 are substantially equal to a first predetermined power level, $p_0$, where $p_0 > 0$ milliwatts or, in other words, $p_0$ has a non-zero value. In FIG. 7B, the transmission power level of the first component carrier 702a is reduced from $p_0$ to $p_1$, where $p_0 > p_1 > 0$ milliwatts.

FIG. 8 is a schematic illustration of a user equipment (UE) 804 transmitting an uplink transmission 812 to a scheduling entity 808 in accordance with some aspects of the disclosure. Examples of the uplink transmission 812 may include at least one of: a physical random access channel (PRACH) transmission, a physical uplink control channel (PUCCH) transmission, a physical uplink shared channel (PUSCH) transmission, or a sounding reference signal (SRS) transmission.

For exemplary and non-limiting reasons, a first serving cell 802a may be served by the first component carrier 702a of FIG. 7A. A second serving cell 806 may be served by the second component carrier 706 of FIG. 7A. A third serving cell 810 may be served by the third component carrier 710 of FIG. 7A. In FIG. 8, the solid line representations of the first serving cell 802a, the second serving cell, 806, and the third serving cell 810 indicates that the first component carrier 702a, the second component carrier 706, and the third component carrier 710 are transmitted from the UE 804 at the transmit power level of $p_0$.

Also depicted in FIG. 8 is a human form 814. The human form 814 is used as a surrogate to represent, for example, a human head, hand, or other body part. In FIG. 8, the human form 814 is oriented between the UE 804 and the scheduling entity 808. The orientation is meant to represent that the uplink transmission 812 impinges on, and/or passes into, and/or passes through some part of the human form 814. In practice, the UE 804 may be, for example, held in the human's hand, placed in the pocket of the human's clothing, held against the human's ear, or held near the human's head. The orientation of the human form 814 between the UE 804 and the scheduling entity 808 is not meant to be limiting. The UE 804 may radiate omni directionally and/or directionally. Regardless of the orientation of the human form 814 with respect to the UE 804 (e.g., between the UE 804 and the scheduling entity 808, behind the UE 804 and in line with the scheduling entity 808, or any orientation), when the UE 804 is being used for its intended purpose, radiation from the UE 804 will impinge on, and/or pass into, and/or pass through some part of the human form 814.

Standard setting bodies, such as the Third Generation Partnership Project (3GPP) and/or the Institute of Electrical and Electronics Engineers (IEEE) have established maximum permissible electromagnetic power density exposure levels, referred to as maximum permissible exposure (MPE) levels to ensure that when there is inter-band carrier aggregation, the sum of the power from the aggregated component carriers across all bands does not exceed the MPE level. Therefore, a scheduling entity 808 and/or a UE 804 may set transmit power levels for each component carrier on TDD UL channels.

According to New Radio (NR) standards, a frequency range of 410 MHz-7125 MHz corresponds to an FR1 frequency range designation, while a frequency range of 24250 MHz-52600 MHz corresponds to an FR2 frequency range designation. In a time division duplex (TDD) mode, in the NR FR2 band designated n257, the uplink (UL) operating band is equal to the downlink (DL) operating band, namely $F_{UL\_low}$-$F_{UL\_high}$=$F_{DL\_low}$-$F_{DL\_high}$=26500 MHZ-29500 MHz. Twenty-eight GHz (28 GHz) is given as the band alias for the n257 band. In the TDD mode, in the NR FR2 band designated n258, the UL operating band is equal to the DL operating band, namely $F_{UL\_low}$-$F_{UL\_high}$=$F_{DL\_low}$-$F_{DL\_high}$=24250 MHZ-27500 MHZ. Twenty-six GHz (26 GHZ) is given as the band alias for the n258 band. In the TDD mode, in the NR FR2 band designated n260, the uplink (UL) operating band is equal to the downlink operating band, namely $F_{UL\_low}$-$F_{UL\_high}$=$F_{DL\_low}$-$F_{DL\_high}$=37000 MHz-40000 MHZ. Thirty-nine GHz (39 GHz) is given as the band alias for the n260 band. Sixty GHz (60 GHz) is given as a band alias for operating bands in the 60 GHz frequency range.

When there is inter-band carrier aggregation, whether a TDD pattern across the bands is aligned, or is not aligned, a total MPE due to all aggregated component carriers should not exceed the MPE level set by a given standard setting body.

As indicted earlier, in inter-band carrier aggregation, because the component carriers may be separated by frequency gaps and because of the separation between frequency bands is large, the pathloss of a first component carrier 702a may be different from the pathloss of the second component carrier 706. For example, a first component carrier in the 28 GHz band may suffer less pathloss than a second component carrier in the 39 GHz band, given equal transmit power levels at the UE (e.g., UE 804 of FIG. 8). By way of another example, a first component carrier in the 28 GHz band may suffer less pathloss than a second component carrier in the 60 GHz band, given equal transmit power levels at the UE.

In the example of FIG. 7A, FIG. 7B, and FIG. 8, the first frequency band 704 may be the 28 GHz band and the second frequency band 708 may be the 60 GHz band. With the transmit power of the UE 804 set to $p_0$ for the first component carrier 702a, the second component carrier 706, and the third component carrier 710, the ranges of the first serving cell 802a, the second serving cell 806 and the third serving cell 810 may be graphically illustrated as shown. Despite a greater pathloss experienced by the second component carrier 706 and the third component carrier 710 in the 60 GHz band, the transmit power level p0 provides sufficient strength to allow the UE 804 to communicate with the scheduling entity 808. However, because there is less pathloss between the UE 804 and the scheduling entity 808 for the first component carrier 702a (in the 28 GHz frequency band), the same output power level p0 provides for potential communication with nodes further away from the scheduling entity 808.

In this non-limiting example of FIG. 8, a total configured power PCMAX in the depicted transmission occasion of FIG. 7A and FIG. 8 is the sum of the configured power of all component carriers f of serving cell c with non-zero granted transmission power in at the various respective reference points defined by f and c. In the example of FIG. 8, the sum of the configured power of first component carrier 702a of first serving cell 802a, plus the second component carrier 706 of the second serving cell 806, plus the third component carrier 710 of the third serving cell 810 results in an electromagnetic power density exposure level for the human form 814 that exceeds the MPE level set by the standard setting body.

Because the power level of $p_0$ for the first component carrier 702a results in the first serving cell 808a area that is larger than necessary for the UE 804 to communicate with the scheduling entity 808, the transmit power level of the first component carrier may be reduced to $p_1$, as shown in FIG. 7B. Reducing the transmit power level of the first component carrier 702b to $p_1$ reduces the area of the first serving cell 802a to that of the reduced first serving cell 802b. The scheduling entity 808 is still within range of the UE 804, however, reducing the transmit power of the first component carrier 702b to $p_1$ has the benefit of reducing the total configured power PCMAX to a level that results in an electromagnetic power density exposure level for the human form 814 that is at or below the MPE level, thus resulting in a satisfactory MPE level for the human form 814.

According to some aspects, the first serving cell 808a or reduced first serving cell 808b may be the primary serving cell, which is served by the first component carrier 702b, also referred to as the primary component carrier. RRC connection messages and user data may be transmitted on primary component carrier. The second serving cell 806 may be a first secondary serving cell, which is served by the second component carrier 706, also referred to as the first secondary component carrier. The third serving cell 810 may be a second secondary serving cell, which is served by the third component carrier 710, also referred to as the second secondary component carrier. User data may be transmitted over the second component carrier 706 (i.e., the first secondary component carrier) and the third component carrier 710 (i.e., the second secondary component carrier) on an as needed basis.

As indicated above, a total configured UE maximum output power $P_{CMAX}$ in a transmission occasion is a sum of the configured power for every carrier f of serving cell c with non-zero granted transmission power in the respective reference point. A UE may be allowed to set its own maximum output power, $P_{CMAX}$. The configured maximum UE output power ($P_{CMAX}$) may be set such that a corresponding measured total peak equivalent isotropically radiated power (EIRP), of the measured configured maximum UE output power ($P_{UMAX}$), is within the following bounds:

$$P_{PowerClass} - MAX(MAX(MPR, A\text{-}MPR), P\text{-}MPR) - MAX\{T(MAX(MPR, A\text{-}MPR)), T(P\text{-}MPR)\} \leq P_{UMAX} \leq EIRP_{max}$$

where:

$P_{PowerClass}$ is a maximum UE power specified without taking into account power level tolerances (e.g., for Carrier Aggregation EUTRA bands CA_1C and CA_40C, Class 3, $P_{Powerclass}$=23 dBm);

MAX is a function that returns the largest value from the numbers provided (e.g., MAX (A, B)=A, if A>B);

MPR is a Maximum Power Reduction.

A-MPR is an Additional Maximum Power Reduction.

P-MPR is the Power Management Maximum Power Reduction;

P-MPR$_{f,c}$ is the Power Management UE Maximum Power Reduction for carrier f of serving cell c;

T refers to a tolerance table, for example, T(P$_{CMAX}$) refers to a P$_{CMAX}$ tolerance table such as the following:

| P$_{CMAX}$ (dBm) | Tolerance T(P$_{CMAX}$) (dBm) |
|---|---|
| 21 ≤ P$_{CMAX}$ ≤ 23 | 2.0 |
| 20 ≤ P$_{CMAX}$ < 21 | 2.5 |
| 19 ≤ P$_{CMAX}$ < 20 | 3.5 |
| 18 ≤ P$_{CMAX}$ < 19 | 4.0 |
| 13 ≤ P$_{CMAX}$ < 18 | 5.0 |
| 8 ≤ P$_{CMAX}$ < 13 | 6.0 |
| −40 ≤ P$_{CMAX}$ < 8 | 7.0 |

The corresponding measured total radiated power P$_{TMAX, f,c}$ is bounded by:

$$P_{TMAX,f,c} \leq TRP_{max}$$

where:

TRPmax is the maximum total radiated power (TRP) for a specified UE power class. Total radiated power (TRP) is a measure of how much power is radiated by an antenna when the antenna is connected to an actual radio (or transmitter).

The value of P$_{UMAX}$ may be defined as follows: P$_{UMAX}$=10*log 10 (Σp$_{UMAX,f(i),c(j)}$), for each carrier f(i=1 . . . n) and serving cell c(j=1 . . . m) where p$_{UMAX,f(i),c(j)}$ is a linear value of P$_{UMAX,f(i),c(j)}$.

According to some aspects, a UE may use a downlink beam as a quasi co-located (QCL) source to multiple UL beams. Two antenna ports are said to be quasi co-located if properties of the channel over which a symbol on one antenna port is conveyed can be inferred from the channel over which a symbol on the other antenna port is conveyed. Accordingly, a UE may estimate the properties (e.g., pathloss) of an uplink channel based on determined properties of a downlink channel.

P-MPR may be an allowed maximum output power reduction, which a UE, such as UE 804 of FIG. 8, may apply to each carrier f of serving cell c. The UE may apply the P-MPR to, for example, ensure compliance with applicable electromagnetic power density exposure requirements, address unwanted emissions/self-defense requirements in case of simultaneous transmissions on multiple radio access technologies (RATs), and/or ensure compliance with applicable electromagnetic power density exposure requirements in case of proximity detection, to address such requirements (e.g., MPE) that may require a lower maximum output power.

Proximity detection may be used to detect when a UE (such as UE 804 of FIG. 8) is placed next to an ear of a user (such as human form 814 of FIG. 8). In at least the proximity detection case, the UE may reduce its maximum output power through use of the P-MPR, to allow the UE to comply with MPE limits. A reduction in maximum output power may be achieved by increasing P-MPR, where, as stated earlier, P-MPR is the power management UE maximum power reduction for carrier f of serving cell c.

However, it may be unnecessary to increase P-MPR for ever carrier f of every serving cell c. As illustrated in FIG. 7A, FIG. 7B and FIG. 8, there may be instances where a reduction in power may be made for one or more but less than all component carriers in all serving cells in a carrier aggregation mode. Prioritization of the power reductions of component carriers in the serving cells for TDD UL carrier aggregation cases may allow for an orderly reduction in total output power of a UE.

A first option for prioritization may be based on frequency bands and more particularly on the center frequencies or (aliases) of frequency bands. The first option may be referred to as band prioritization. In band prioritization, one frequency band is prioritized over another. In one example, 28 GHz may have a higher priority than 39 GHz (28 GHZ$_{Priority}$>39 GHZ$_{Priority}$). In another example, 39 GHz may have a higher priority than 60 GHZ (39 GHZ$_{Priority}$>60 GHZ$_{Priority}$). In band prioritization, it may not always be the higher frequency the has the higher priority. For example, in one case 39 GHz may have a higher priority than 28 GHZ (39 GHZ$_{Priority}$>28 GHZ$_{Priority}$).

In band prioritization, a predetermined cell order may be selected, or a cell order may be determined and/or designated by a scheduling entity and may be conveyed to a UE in a downlink message, such as an RRC message. Alternatively, the predetermined cell order may be selected, or a cell order may be determined and/or designated by the UE itself (without receiving any instruction to implement any particular cell order form a scheduling entity).

By way of non-limiting example, in an inter-band carrier aggregation scenario with two component carrier frequencies having two serving cells per each component carrier, a prioritization order or a priority rank of cells may follow the following pattern C1=(f(1), c(1))>C2=(f(1), c(2))>C3=(f(2), c(1))>C4=(f(2), c(2)), where f(i) identified a component carrier frequency band and c(j) identifies a serving cell among multiple serving cells served by the component carrier frequency band. According to the preceding pattern, C1 has a highest priority. The priority of C1 is higher than the priority of C2; the priority of C2 is higher than the priority of C3, and the priority of C3 is higher than the priority of C4.

A higher priority value may yield a higher value of P-MPR for a given component carrier frequency and serving cell identity (as represented by C1, C2, C3, and C4). A value of P-MPR may be determined relative to a presently established value of P-MPR for a given component carrier frequency and serving cell pair. The P-MPR may be stored in a memory of the UE. The higher the value of P-MPR, the higher the amount of reduction in transmit power. For example, if a current value of P-MPR for a given component carrier frequency and serving cell is 2 dB (signifying a 2 dB reduction in transmitted power), the higher value of P-MPR may be any value higher than 2 dB (e.g., 3 dB). In another example, a smaller priority value may yield a higher value of P-MPR for a given component carrier frequency and serving cell identity.

Figure 9:
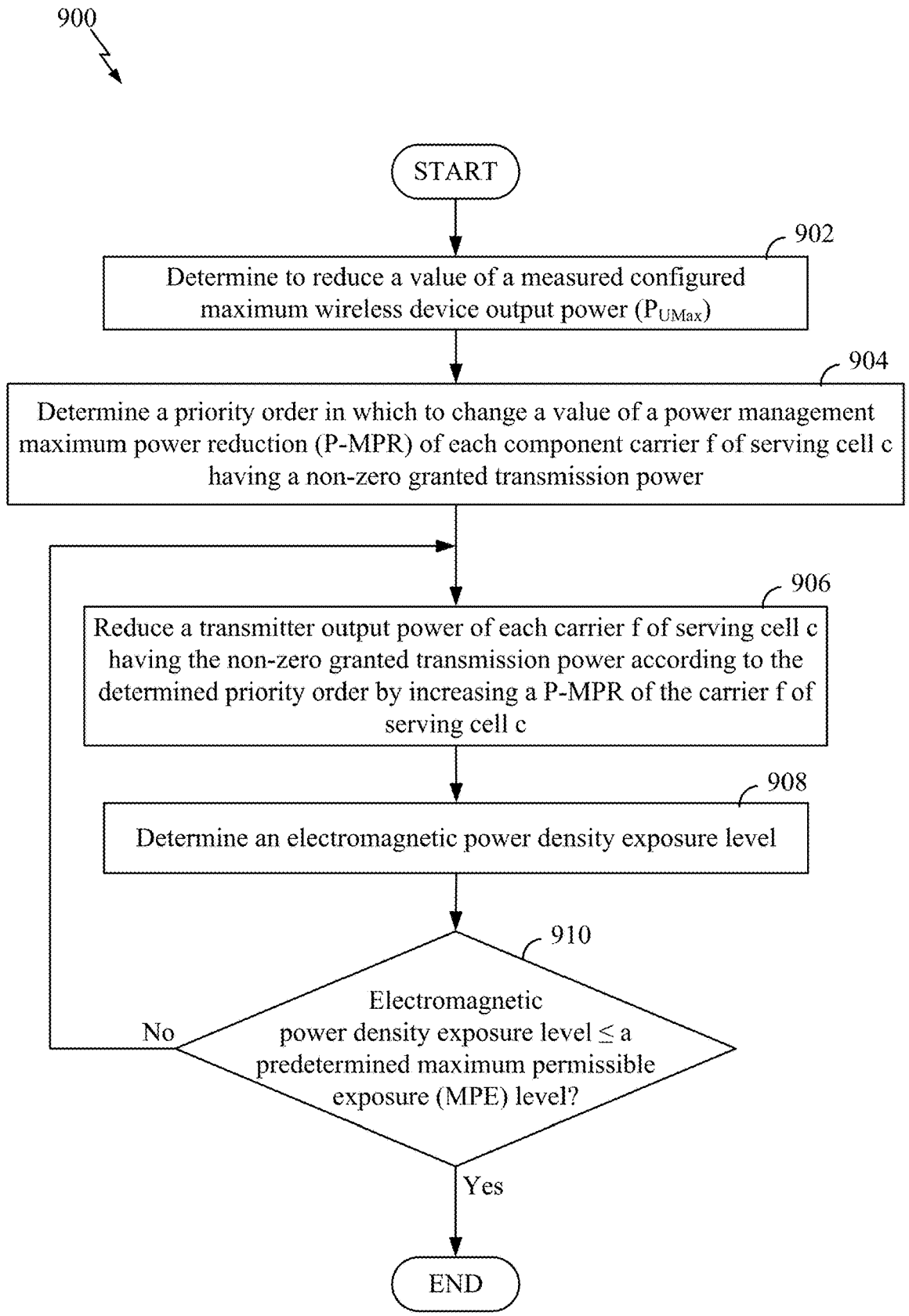
FIG. 9 is a flow cart illustrating an exemplary method of wireless communication using inter-band carrier aggregation at a user equipment (UE) in accordance with some aspects of the disclosure.

FIG. 9 is a flow cart illustrating an exemplary method 900 of wireless communication using inter-band carrier aggregation at a user equipment (UE) in accordance with some aspects of the disclosure. As described below, some or all illustrated features may be omitted in a particular implementation within the scope of the present disclosure, and some illustrated features may not be required for implementation of all embodiments. In some examples, the method 900 may be carried out by the scheduled entity 600 illustrated in FIG. 6. In some examples, the method 900 may be carried out by any suitable apparatus or means for carrying out the functions or algorithm described below.

At block 902, the UE may determine to reduce a value of a measured configured maximum UE output power (P$_{UMAX}$). According to one example, the determination may be made by detecting a configuration of the UE that requires a reduction of a value of $P_{UMAX}$. The detected configuration may be, for example, an indication of proximity of the UE to a surface, such as a human head or a human hand. According to some aspects, the UE may receive an instruction to reduce the value of the $P_{UMAX}$ from a scheduling entity, and thereby make the determination to reduce the value of $P_{UMAX}$ based on receipt of the instruction.

At block 904, the UE may determine a priority order in which to change a value of a power management UE maximum power reduction (P-MPR) of each component carrier f of serving cell c having a non-zero granted transmission power at a respective reference point defined by the component carrier frequency f and an associated serving cell c identity among a plurality of aggregated component carriers. According to some aspects, the UE may receive the priority order from a scheduling entity; the determining of the priority order may then be based on the priority order received from the scheduling entity. For example, the priority order determined by the UE may be the priority order received from the scheduling entity.

At block 906, the UE may reduce a transmitter output power of each carrier f of serving cell c having the non-zero granted transmission power according to the determined priority order by increasing a P-MPR of the carrier f of serving cell c. The reduction of the transmitter output power may reduce $P_{UMAX}$.

At block 908, the UE may determine an electromagnetic power density exposure level, at the UE. The determination of the electromagnetic power density exposure level may occur, for example, after reducing $P_{UMAX}$.

At block 910 the UE may determine if the electromagnetic power density exposure level is at or below a predetermined maximum permissible exposure (MPE) level. The UE returns to block 906, reducing the transmitter power, if the electromagnetic power density exposure level is greater than the predetermined MPE level. If, at block 910, the electromagnetic power density exposure level is less than or equal to the predetermined maximum permissible exposure (MPE) level, the UE may end practice of the method.

A second option for prioritization may be based on uplink UL channel-priority. The second option may be referred to as the channel prioritization option. In one example, the uplink channel-priority (C-pri) may ranges from a value of 1 to a value of 5, with 1 representing a highest priority and 5 representing a lowest priority. A greater or lesser number of priorities is within the scope of the disclosure. Accordingly, for the example shown below, C-pri may equal 1, 2, 3, 4, or 5. Five UL channel transmissions are presented below in priority order. The five UL channel transmissions are presented for exemplary and non-limiting purposes. Other types of UL channel transmissions, other numbers of UL channel transmissions, and reordering of the UL channel transmissions in order or rank are within the scope of the disclosure. The exemplary list of five UL channel transmissions, in order of priority with 1 representing the highest priority are:

1. Physical random access channel (PRACH) transmission on a primary cell (PCell);
2. Physical uplink control channel (PUCCH) transmission with HARQ-ACK information and/or a scheduling request (SR) transmission, an/or a physical uplink shared channel (PUSCH) transmission with HARQ-ACK information;
3. PUCCH transmission with channel state information (CSI) and/or PUSCH transmission with CSI;
4. PUSCH transmission without HARQ-ACK information or CSI; and
5. Sounding reference signal (SRS) transmission, with aperiodic SRS having higher priority than semi-persistent and/or periodic SRS, or PRACH transmission on a serving cell other than the PCell In the case of two or more uplink transmissions with the same channel-priority rank, and for operation with carrier aggregation, the UE may, for example, prioritize power allocation for transmissions on the primary cell of a master cell group (MCG) or a secondary cell group (SCG) over transmissions on a secondary cell.

The second option, the prioritization option, may be applied across uplink channels that have the same value of another type of priority. For example, the value of the other type of priority value can be "1" or "0". The value of other type of priority can be service-priority value, such as "1" or "high" for ultra-reliable low-latency communication (URLLC) or "0" or "low" for enhanced mobile broadband (eMBB).

As with the first option, the band prioritization option, the priority order for P-MPR may be determined by a scheduling entity and conveyed to a UE via, for example, an RRC configuration message and/or determined by UE without any instruction sent to the UE from the scheduling entity to implement any particular order to UL channel transmissions. According to one aspect, the order or rank of the types and priorities of a plurality of channel transmissions may be predetermined and may be stored at the scheduling entity and periodically conveyed (e.g., as an update) to the UE or may be predetermined and may be stored at the UE.

Figure 10:
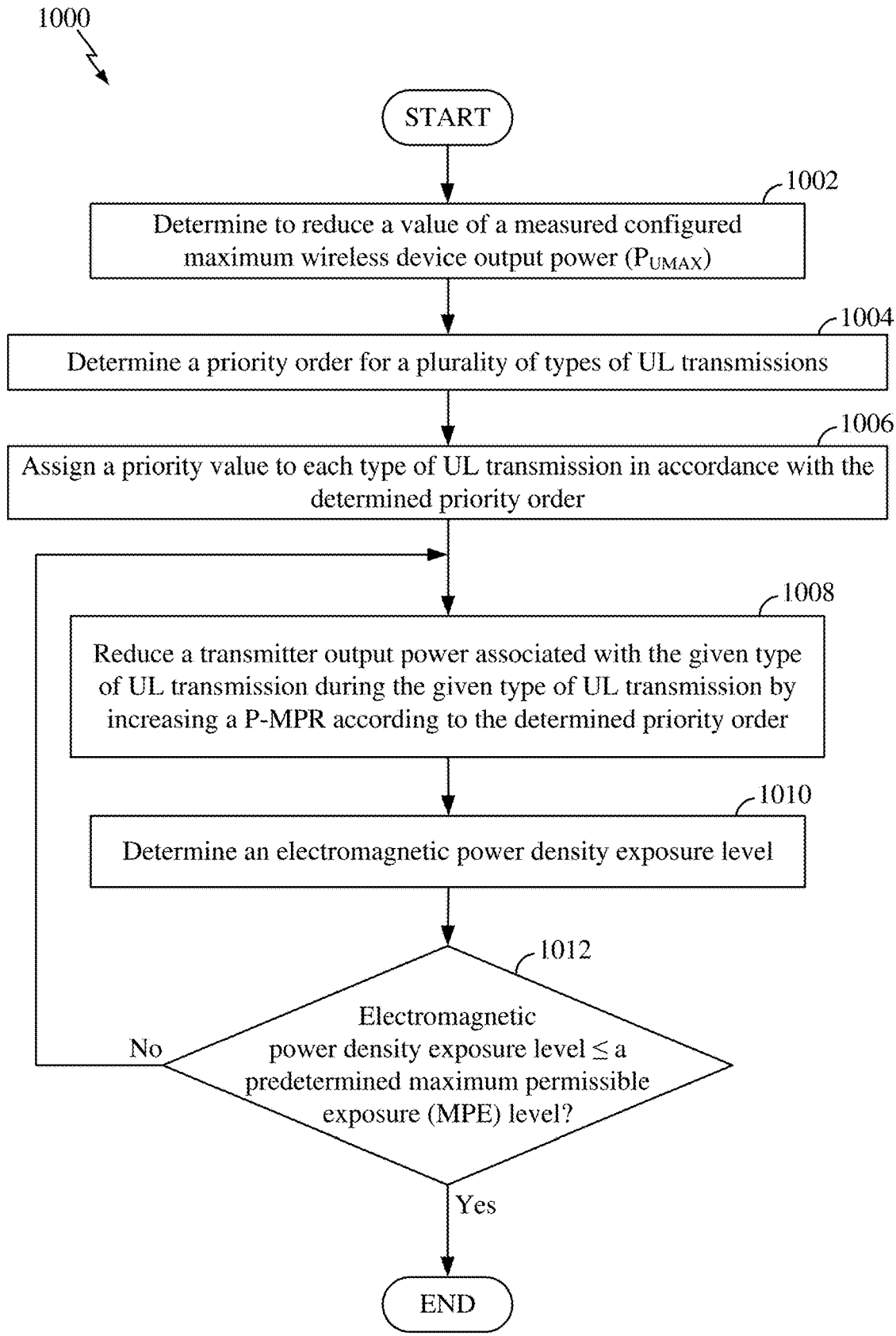
FIG. 10 is a flow chart illustrating an exemplary method of wireless communication using inter-band carrier aggregation at a user equipment (UE) in accordance with some aspects of the disclosure.

FIG. 10 is a flow chart illustrating an exemplary method 1000 of wireless communication using inter-band carrier aggregation at a user equipment (UE) in accordance with some aspects of the disclosure. As described below, some or all illustrated features may be omitted in a particular implementation within the scope of the present disclosure, and some illustrated features may not be required for implementation of all embodiments. In some examples, the method may be carried out by the scheduled entity 600 illustrated in FIG. 6. In some examples, the method 1000 may be carried out by any suitable apparatus or means for carrying out the functions or algorithm described below.

At block 1002, the UE may determine to reduce a value of a measured configured maximum UE output power ($P_{UMAX}$). According to one example, the determination may be made by detecting a configuration of the UE that requires a reduction of a value of $P_{UMAX}$. The detected configuration may be, for example, an indication of proximity of the UE to a surface, such as a human head or a human hand. According to some aspects, the UE may receive an instruction to reduce the value of the $P_{UMAX}$ from a scheduling entity, and thereby make the determination to reduce the value of $P_{UMAX}$ based on receipt of the instructions.

At block 1004, the UE may determine a priority order of a plurality of types of uplink (UL) transmissions. According to some aspects, the UE may receive the priority order from a scheduling entity; the determining of the priority order may then be based on the priority order received from the scheduling entity. For example, the priority order determined by the UE may be the priority order received from the scheduling entity.

At block 1006, the UE may assign a priority value to each type of UL transmission in accordance with the determined priority order. According to one aspect, a value of a power management UE maximum power reduction (P-MPR) associated with each given type of UL transmission would change according to the priority value assigned to the given type of UL transmission.

At block 1008, the UE may reduce a transmitter output power associated with the given type of UL transmission during the given type of UL transmission by increasing a P-MPR (associated with the given type of UL transmission) according to the determined priority order. The reduction of the transmitter output power may reduce $P_{UMAX}$.

At block 1010, the UE may determine an electromagnetic power density exposure level, at the UE. The determination of the electromagnetic power density exposure level may occur, for example after reducing $P_{UMAX}$.

At block 1012 the UE may determine if the electromagnetic power density exposure level is at or below a predetermined maximum permissible exposure (MPE) level. The UE returns to block 1008, reducing the transmitter power, if the electromagnetic power density exposure level is greater than the predetermined MPE level. If, at block 1012, the electromagnetic power density exposure level is less than or equal to the predetermined maximum permissible exposure (MPE) level, the UE may end practice of the method.

A third option for prioritization may be based on another type of priority or priorities associated with various uplink channels. For example, the other type of priorities can be service priorities. The third option may be referred to as the service prioritization option. The third option may be useful in the presence of mixed service priorities such as "1" or "high" for ultra-reliable low-latency communication (URLLC) or "0" or "low" for enhanced mobile broadband (eMBB). According to one aspect, a service-priority (S-pri) value may be equal to "0" for eMBB and "1" for URLLC. Other types of services and different values of service priorities are within the scope of the disclosure.

In one aspect, service prioritization may encompass both service prioritization and channel prioritization. For example, a UE may first prioritize a first set of UL channels with higher service-priority (S-pri) than a second set of UL channels with lower service-priority, where the first and second sets are different. Second, the UE may prioritize UL channels in a given one of the first set and second set using channel prioritization (C-pri) as described above with the second option.

The following three sets of examples illustrate the service prioritization option. The ">" symbol indicates that the UL channel to the left of the ">" symbol has a higher priority than the UL channel to the right of the symbol. The three sets of examples are:

PUCCH with ACK in PUCCH group 1 of higher S-pri value>PUSCH with ACK in PUCCH group 2 of lower S-pri value PUSCH with ACK in PUCCH group 1 of higher S-pri value>PUSCH with ACK in PUCCH group 2 of lower S-pri value PUCCH with CSI in PUCCH group 1 of higher S-pri value>PUCCH with ACK in PUCCH group 2 of lower S-pri value The three examples presented above are presented for exemplary and non-limiting purposes. Other types of UL channels with other types of information, or other combinations or UL channels are within the scope of the disclosure.

By way of further example, four cases may be considered. Each case involves a PUCCH having a first group (group 1) and a second group (group 2). In case one, a PUCCH in PUCCH group 1 having an S-pri value of 1 is compared to a PUSCH in PUCCH group 2 having an S-pri value of 0. According to the service prioritization option, the PUCCH in PUCCH group 1 having the S-pri value of 1 is given a higher priority regarding transmit power than the PUSCH in PUCCH group 2 having the S-pri value of 0.

In case two, a PUSCH in PUCCH group 1 having an S-pri value of 1 is compared to a PUSCH in PUCCH group 2 having an S-pri value of 0. According to the service prioritization option, the PUSCH in PUCCH group 1 having the S-pri value of 1 is given a higher priority regarding transmit power than the PUSCH in PUCCH group 2 having the S-pri value of 0.

In case three, a PUCCH in PUCCH group 1 having an S-pri value of 0 is compared to a PUCCH in PUCCH group 2 having an S-pri value of 1. According to the service prioritization option, the PUCCH in PUCCH group 2 having the S-pri value of 1 is given a higher priority regarding transmit power than the PUCCH in PUCCH group 1 having the S-pri value of 0.

In case four, a PUSCH in PUCCH group 1 having an S-pri value of 0 is compared to a PUCCH in PUCCH group 2 having an S-pri value of 1. According to the service prioritization option, the PUCCH in PUCCH group 2 having the S-pri value of 1 is given a higher priority regarding transmit power than the PUSCH in PUCCH group 1 having the S-pri value of 0.

As with the first and second options, the priority order or priority rank of the various UL channels may be determined by a scheduling entity and conveyed to a UE via, for example, an RRC configuration message and/or determined by the UE without any instruction sent to the UE from the scheduling entity. According to one aspect, the order or rank of the various UL channel types and a position of each of the various UL channel types in order or rank may be predetermined and may be stored at the scheduling entity and periodically conveyed (e.g., as an update) to the UE, or may be predetermined and may be stored at the UE.

Figure 11:
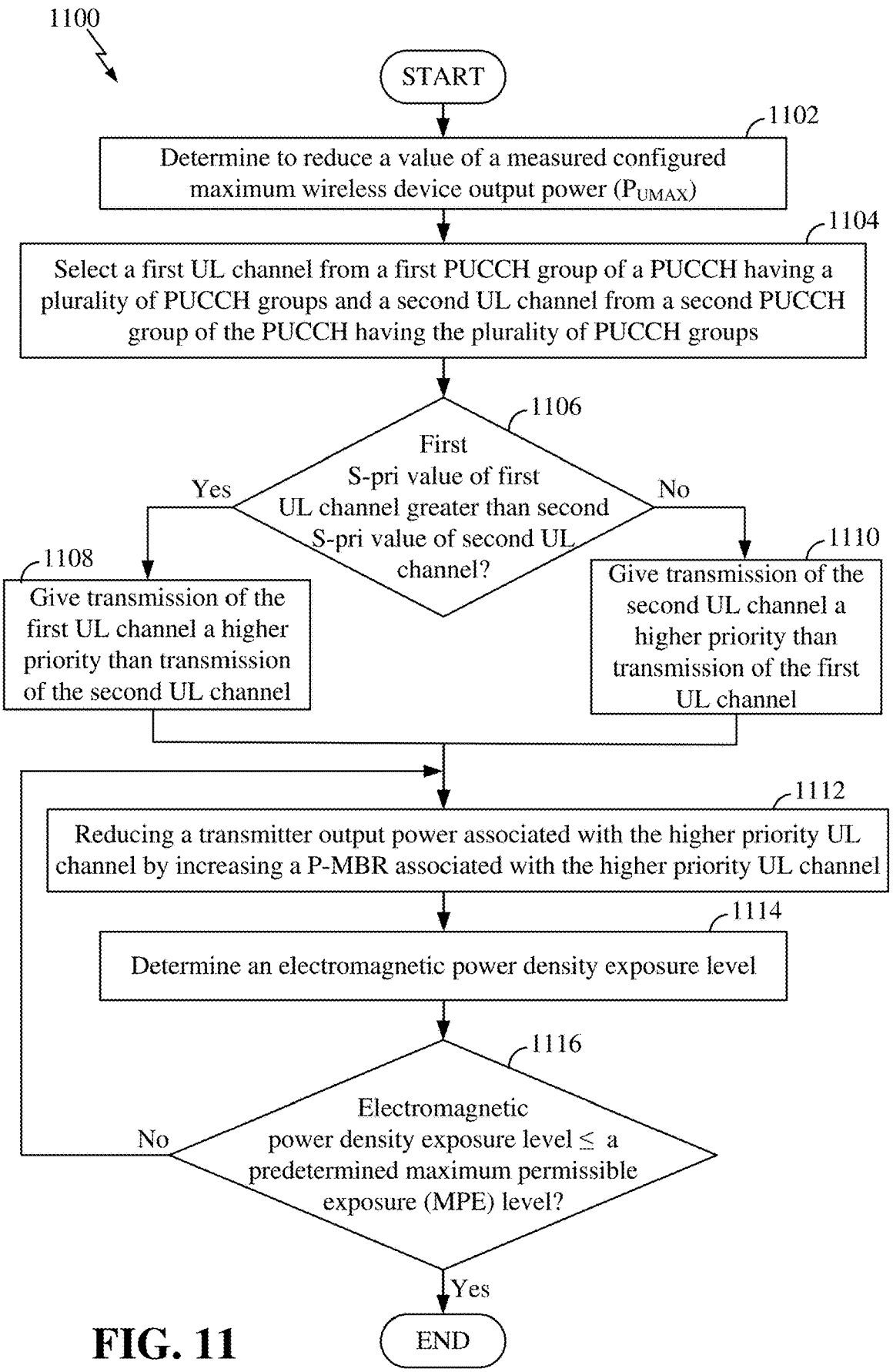
FIG. 11 is a flow chart illustrating an exemplary method of wireless communication using inter-band carrier aggregation at a user equipment (UE) in accordance with some aspects of the disclosure.

FIG. 11 is a flow chart illustrating an exemplary method 1100 of wireless communication using inter-band carrier aggregation at a user equipment (UE) in accordance with some aspects of the disclosure. As described below, some or all illustrated features may be omitted in a particular implementation within the scope of the present disclosure, and some illustrated features may not be required for implementation of all embodiments. In some examples, the method 1100 may be carried out by the scheduled entity 600 illustrated in FIG. 6. In some examples, the method 1100 may be carried out by any suitable apparatus or means for carrying out the functions or algorithm described below.

At block 1102, the UE may determine to reduce a value of a measured configured maximum UE output power ($P_{UMAX}$). According to one example, the determination may be made by detecting a configuration of the UE that requires a reduction of a value of $P_{UMAX}$. The detected configuration may be, for example, an indication of proximity of the UE to a surface, such as a human head or a human hand. According to some aspects, the UE may receive an instruction to reduce the value of the $P_{UMAX}$ from a scheduling entity, and thereby make the determination to reduce the value of $P_{UMAX}$ based on receipt of the instructions.

At block 1104, the UE may select a first UL channel from a first PUCCH group of a PUCCH having a plurality of PUCCH groups and a second UL channel from a second PUCCH group of the PUCCH having the plurality of PUCCH groups.

At block 1106, the UE may determine (e.g., by comparison) if a first service-priority (S-pri) value of the first UL channel is higher than a second S-pri value of the second UL channel. If the first S-pri value is higher than the second S-pri value, a transmission of the first UL channel is given a higher priority than a transmission of the second UL channel at block 1108. If the first S-pri value is less than the second S-pri value, a transmission of the second UL channel is given a higher priority than a transmission of the first UL channel at block 1110. In other words, the UE may give a higher priority for transmission to that one of the first UL channel or the second UL channel that has a highest S-pri value. According to one aspect, a value of a power management UE maximum power reduction (P-MPR) associated with the first UL channel and the second UL channel would change according which UL channel is given the highest priority.

According to some aspects, the UE may receive the priority order from a scheduling entity; the determining of the priority order may then be based on the priority order received from the scheduling entity. For example, the priority order determined by the UE may be the priority order received from the scheduling entity.

At block 1112, the UE may reduce a transmitter output power associated with the higher priority UL channel by increasing a P-MPR associated with the higher priority UL channel. The reduction of the transmitter output power may reduce $P_{UMAX}$.

At block 1114, the UE may determine an electromagnetic power density exposure level, at the UE. The determination of the electromagnetic power density exposure level may occur, for example after reducing $P_{UMAX}$.

At block 1116 the UE may determine if the electromagnetic power density exposure level is at or below a predetermined maximum permissible exposure (MPE) level. The UE returns to block 1112, reducing the transmitter power, if the electromagnetic power density exposure level is greater than the predetermined MPE level. If, at block 1116, the electromagnetic power density exposure level is less than or equal to the predetermined maximum permissible exposure (MPE) level, the UE may end practice of the method.

According to the third option, when given different UL channels with the same S-pri value, the determination of which UL channel receives the highest priority for transmission power may be determined by application of the order of priority described in connection with the second option, channel prioritization (C-pri). According to one example, a UE may first, prioritize a UL channel with a higher service-priority (S-pri) and then prioritize a UL channel with the same channel priority as the second option, channel-priority (C-pri). A priority order or priority rank of UL channels may be determined and/or designated by a scheduling entity and may be conveyed to a UE in a downlink message, such as an RRC message. Alternatively, the priority order or priority rank may be determined and/or designated by the UE itself (without receiving any instruction to implement any particular order or rank).

Figure 13:
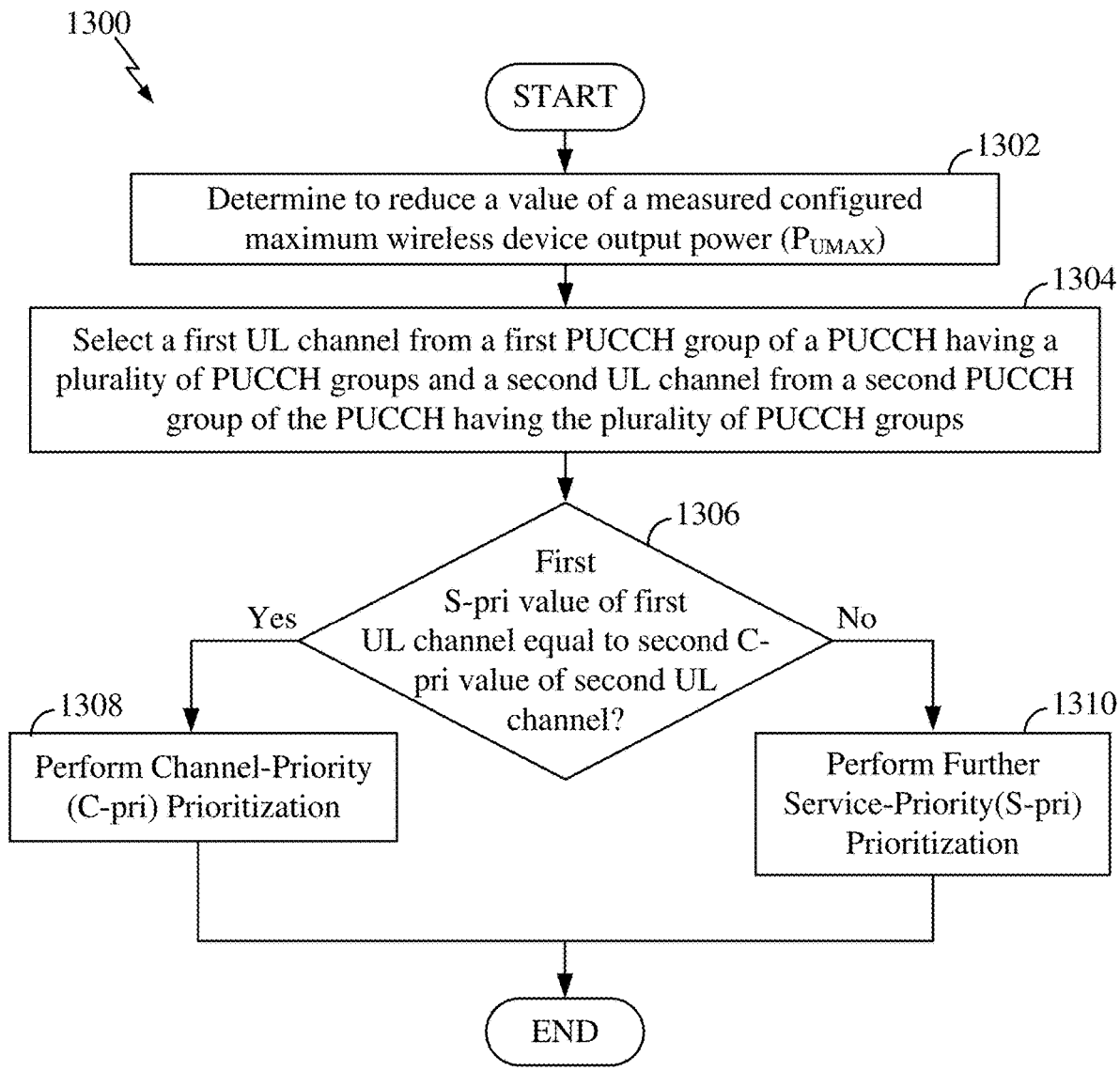
FIG. 13 is a flow chart illustrating an exemplary method of wireless communication using inter-band carrier aggregation at a user equipment (UE) in accordance with some aspects of the disclosure.

FIG. 13 is a flow chart illustrating an exemplary method 1300 of wireless communication using inter-band carrier aggregation at a user equipment (UE) in accordance with some aspects of the disclosure. As described below, some or all illustrated features may be omitted in a particular implementation within the scope of the present disclosure, and some illustrated features may not be required for implementation of all embodiments. In some examples, the method 1100 may be carried out by the scheduled entity 600 illustrated in FIG. 6. In some examples, the method 1100 may be carried out by any suitable apparatus or means for carrying out the functions or algorithm described below.

At block 1302, the UE may determine to reduce a value of a measured configured maximum UE output power ($P_{UMAX}$). According to one example, the determination may be made by detecting a configuration of the UE that requires a reduction of a value of $P_{UMAX}$. The detected configuration may be, for example, an indication of proximity of the UE to a surface, such as a human head or a human hand. According to some aspects, the UE may receive an instruction to reduce the value of the $P_{UMAX}$ from a scheduling entity, and thereby make the determination to reduce the value of $P_{UMAX}$ based on receipt of the instructions.

At block 1304, the UE may select a first UL channel from a first PUCCH group of a PUCCH having a plurality of PUCCH groups and a second UL channel from a second PUCCH group of the PUCCH having the plurality of PUCCH groups.

At block 1306, the UE may determine (e.g., by comparison) if a first service-priority (S-pri) value of the first UL channel is equal to a second S-pri value of the second UL channel. If the first S-pri value is equal to the second S-pri value, the UE may perform channel-priority (C-pri) prioritization at block 1308 as in the second option presented above. If the first S-pri value is not equal to the second S-pri value, the UE may perform further service-priority (S-pri) prioritization at block 1310 as in the third option presented above (e.g., blocks 1106-1116 of FIG. 11).

A fourth option for prioritization may be based on mixed prioritization associated with the channel-priority (C-pri) value and service-priority (S-pri) value of various uplink channels. The fourth option may be referred to as the mixed prioritization option. Similar to the third option, the fourth option may be useful in the presence of mixed service priorities such as "1" or "high" for ultra-reliable low-latency communication (URLLC) or "0" or "low" for enhanced mobile broadband (eMBB). According to one aspect, an S-pri value may be equal to "0" for eMBB and "1" for URLLC. Other types of services and different service priorities are within the scope of the disclosure. For purposes of the examples described below, channel-priority (C-pri) may be the same as that set out in relation to the second option, above.

In one aspect the mixed prioritization may encompass both service prioritization and channel prioritization. For example, a UE may first prioritize a first set of UL channels with higher channel-priority (C-pri) than a second set of UL channels, where the first and second sets are different, as described above with the second option. Second, the UE may prioritize UL channels in a given one of the first set and second set using service-prioritization as described above with the third option.

The following three sets of examples illustrate the mixed prioritization option. The ">" symbol indicates that the UL channel to the left of the ">" symbol has a higher priority than the UL channel to the right of the symbol. The three sets of examples are:

PUCCH with ACK in PUCCH group 1 of higher S-pri value>PUCCH with ACK in PUCCH group 2 of lower S-pri value;

PUSCH with ACK in PUCCH group 1>PUSCH with CSI in PUCCH group 2;

PUCCH with ACK in PUCCH group 1 of higher S-pri value>PUSCH with ACK in PUCCH group 2 of lower S-pri value.

The three examples presented above are presented for exemplary and non-limiting purposes. Other types of UL channels with other types of information, or other combinations or UL channels are within the scope of the disclosure.

As with the first, second, and third options, the priority order or priority rank of the various UL channels may be determined by a scheduling entity and conveyed to a UE via, for example, an RRC configuration message and/or determined by UE without any instruction sent to the UE from the scheduling entity. According to one aspect, the order or rank of the various UL channel types and a position of each of the various UL channel types in order or rank may be predetermined and may be stored at the scheduling entity and periodically conveyed (e.g., as an update) to the UE, or may be predetermined and may be stored at the UE.

Figure 12:
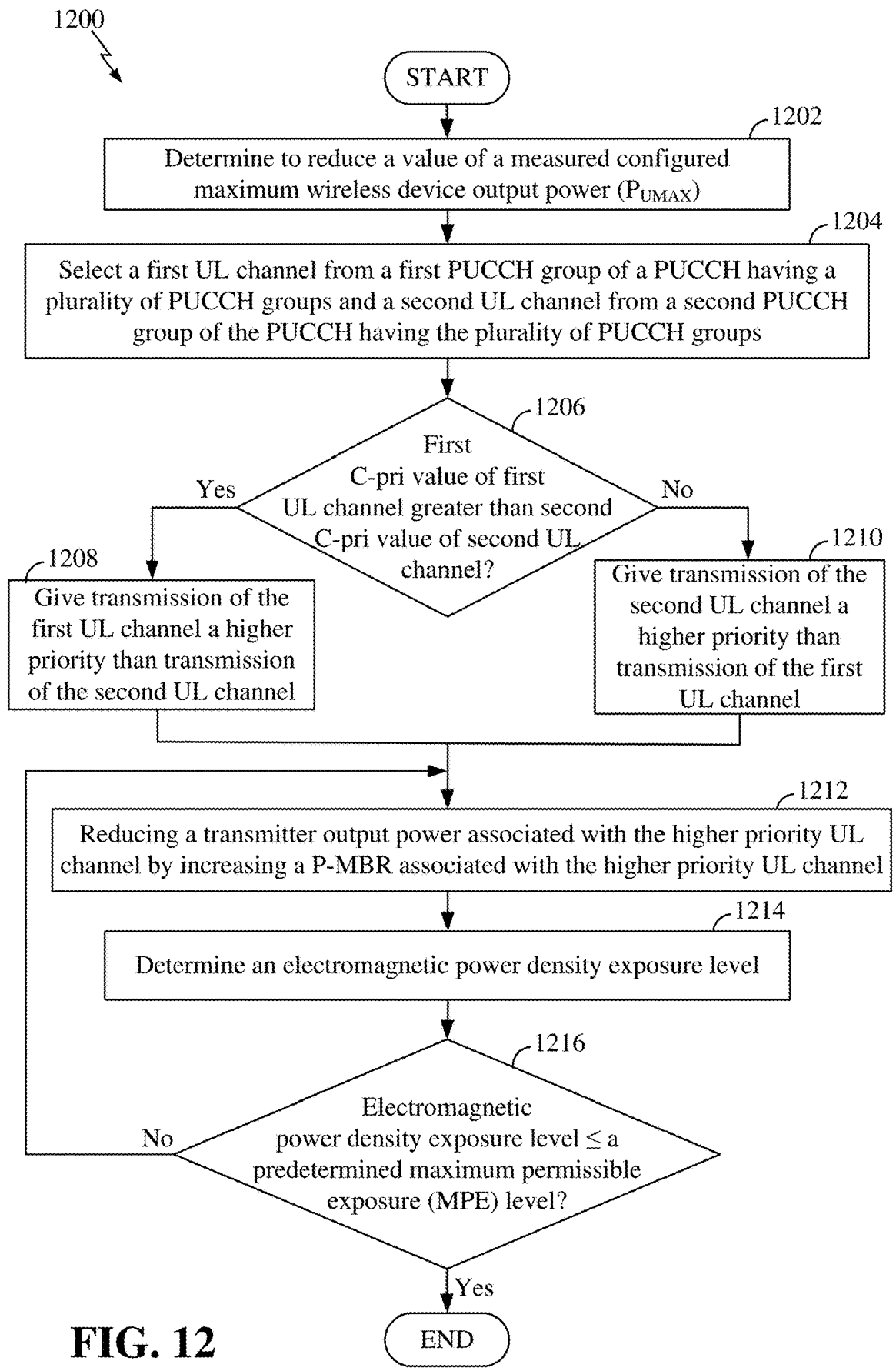
FIG. 12 is a flow chart illustrating an exemplary method of wireless communication using inter-band carrier aggregation at a user equipment (UE) in accordance with some aspects of the disclosure.

FIG. 12 is a flow chart illustrating an exemplary method 1200 of wireless communication using inter-band carrier aggregation at a user equipment (UE) in accordance with some aspects of the disclosure. As described below, some or all illustrated features may be omitted in a particular implementation within the scope of the present disclosure, and some illustrated features may not be required for implementation of all embodiments. In some examples, the method 1200 may be carried out by the scheduled entity 600 illustrated in FIG. 6. In some examples, the method 1200 may be carried out by any suitable apparatus or means for carrying out the functions or algorithm described below.

At block 1202, the UE may determine to reduce a value of a measured configured maximum UE output power ($P_{UMAX}$). According to one example, the determination may be made by detecting a configuration of the UE that requires a reduction of a value of $P_{UMAX}$. The detected configuration may be, for example, an indication of proximity of the UE to a surface, such as a human head or a human hand. According to some aspects, the UE may receive an instruction to reduce the value of the $P_{UMAX}$ from a scheduling entity, and thereby make the determination to reduce the value of $P_{UMAX}$ based on receipt of the instructions.

At block 1204, the UE may select a first UL channel from a first PUCCH group of a PUCCH having a plurality of PUCCH groups and a second UL channel from a second PUCCH group of the PUCCH having the plurality of PUCCH groups.

At block 1206, the UE may determine (e.g., by comparison) if a first channel-priority (C-pri) value of the first UL channel is higher than a second C-pri value of the second UL channel. If the first C-pri value is higher than the second C-pri value, a transmission of the first UL channel is given a higher priority than a transmission of the second UL channel at block 1208. If the first C-pri value is less than the second C-pri value, a transmission of the second UL channel is given a higher priority than a transmission of the first UL channel at block 1210. In other words, the UE may give a higher priority for transmission to that one of the first UL channel or the second UL channel that has a highest C-pri value. According to one aspect, a value of a power management UE maximum power reduction (P-MPR) associated with the first UL channel and the second UL channel would change according which UL channel is given the highest priority.

According to some aspects, the UE may receive the priority order from a scheduling entity; the determining of the priority order may then be based on the priority order received from the scheduling entity. For example, the priority order determined by the UE may be the priority order received from the scheduling entity.

At block 1212, the UE may reduce a transmitter output power associated with the higher priority UL channel by increasing a P-MPR associated with the higher priority UL channel. The reduction of the transmitter output power may reduce $P_{UMAX}$.

At block 1214, the UE may determine an electromagnetic power density exposure level, at the UE. The determination of the electromagnetic power density exposure level may occur, for example after reducing $P_{UMAX}$.

At block 1216 the UE may determine if the electromagnetic power density exposure level is at or below a predetermined maximum permissible exposure (MPE) level. The UE returns to block 1212, reducing the transmitter power, if the electromagnetic power density exposure level is greater than the predetermined MPE level. If, at block 1216, the electromagnetic power density exposure level is less than or equal to the predetermined maximum permissible exposure (MPE) level, the UE may end practice of the method.

According to the fourth option, when given different UL channels with the same C-pri value, the determination of which UL channel receives the highest priority for transmission power may be determined by application of the order of priority described in connection with the third option, service prioritization. According to another example, a UE may first, prioritize a UL channel with lower channel-priority as in the second option (C-pri) and second, prioritize a UL channel with higher service-priority (S-pri) as in the third option (S-pri). According to still another example, a UE may first, prioritize a UL channel with higher channel-priority as in the second option (C-pri) and second, prioritize a UL channel with higher service-priority (S-pri) as in the third option (S-pri). A order of rank of UL channels may be determined and/or designated by a scheduling entity and may be conveyed to a UE via a downlink message, such as an RRC message. Alternatively, the order of rank may be determined and/or designated by the UE itself (without receiving any instruction to implement any particular order of rank).

Figure 14:
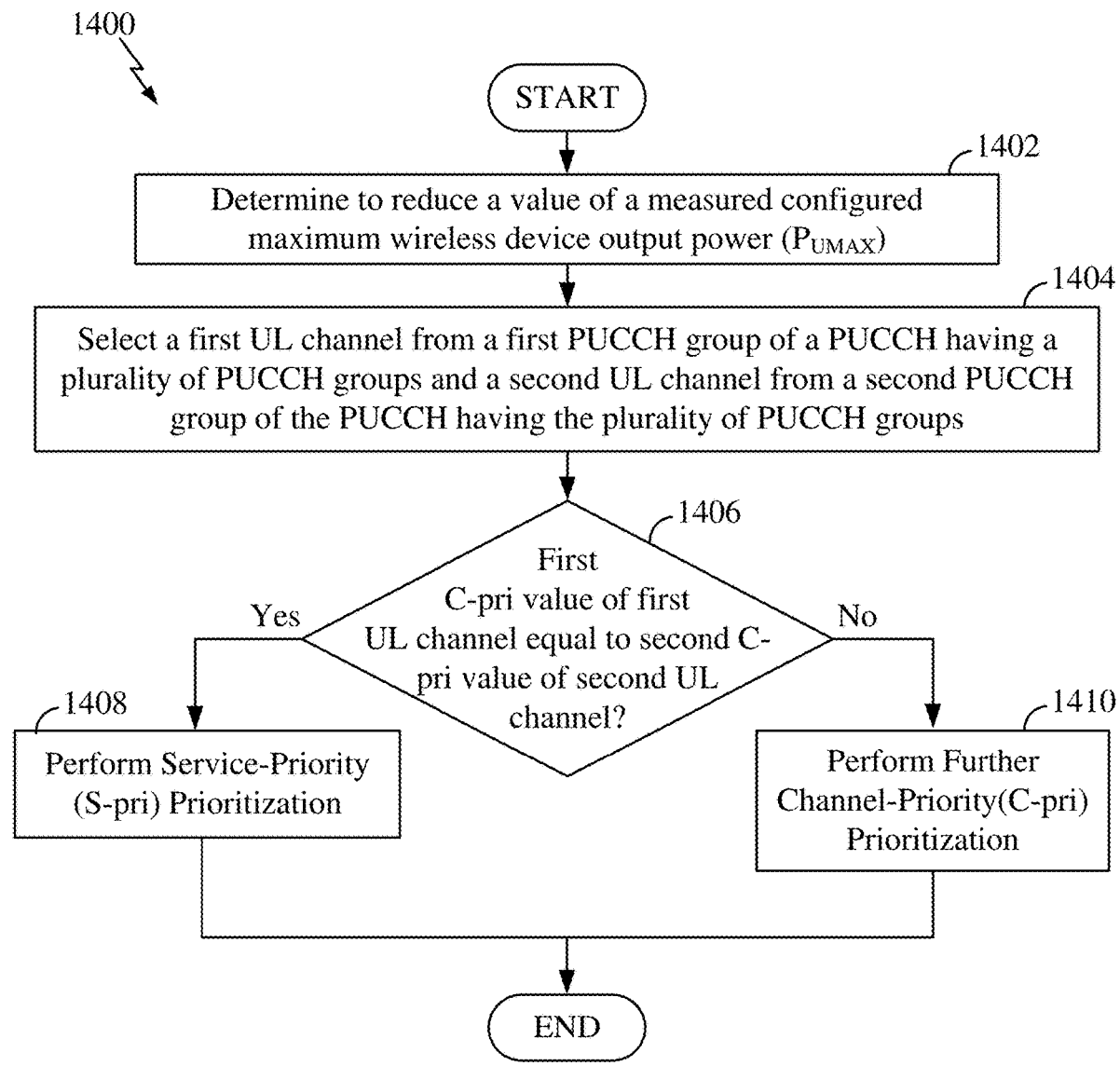
FIG. 14 is a flow chart illustrating an exemplary method of wireless communication using inter-band carrier aggregation at a user equipment (UE) in accordance with some aspects of the disclosure.

FIG. 14 is a flow chart illustrating an exemplary method 1400 of wireless communication using inter-band carrier aggregation at a user equipment (UE) in accordance with some aspects of the disclosure. As described below, some or all illustrated features may be omitted in a particular implementation within the scope of the present disclosure, and some illustrated features may not be required for implementation of all embodiments. In some examples, the method 1400 may be carried out by the scheduled entity 600 illustrated in FIG. 6. In some examples, the method 1400 may be carried out by any suitable apparatus or means for carrying out the functions or algorithm described below.

At block 1402, the UE may determine to reduce a value of a measured configured maximum UE output power ($P_{UMAX}$). According to one example, the determination may be made by detecting a configuration of the UE that requires a reduction of a value of $P_{UMAX}$. The detected configuration may be, for example, an indication of proximity of the UE to a surface, such as a human head or a human hand. According to some aspects, the UE may receive an instruction to reduce the value of the $P_{UMAX}$ from a scheduling entity, and thereby make the determination to reduce the value of $P_{UMAX}$ based on receipt of the instructions.

At block 1404, the UE may select a first UL channel from a first PUCCH group of a PUCCH having a plurality of PUCCH groups and a second UL channel from a second PUCCH group of the PUCCH having the plurality of PUCCH groups.

At block 1406, the UE may determine (e.g., by comparison) if a first channel-priority (C-pri) value of the first UL channel is equal to a second C-pri value of the second UL channel. If the first C-pri value is equal to the second C-pri value, the UE may perform service-priority (S-pri) prioritization at block 1408 as in the third option presented above. If the first C-pri value is not equal to the second C-pri value, the UE may perform further channel-priority (C-pri) prioritization at block 1410 as in the fourth option presented above (e.g., blocks 1206-1216 of FIG. 12).

In one configuration, the apparatus 500, 600 for wireless communication includes means for determining to reduce a value of a measured configured maximum user equipment (UE) output power ($P_{UMAX}$), means for determining a priority order in which to change a value of a power management maximum power reduction (P-MPR) of each component carrier f of serving cell c having a non-zero granted transmission power, means for reducing a transmitter output power of each carrier f of serving cell c having the non-zero granted transmission power according to the determined priority order by increasing a P-MPR of the carrier f of serving cell c, means for determining an electromagnetic power density exposure level, at the UE, means for determining if the electromagnetic power density exposure level is at or below a predetermined maximum permissible exposure (MPE) level, and means for returning to reducing the transmitter output power if the electromagnetic power density exposure level is greater than the predetermined MPE level.

In one aspect, the aforementioned means may be the processor(s) 504, 604 shown in FIGS. 5 and 6 configured to perform the functions recited by the aforementioned means. In another aspect, the aforementioned means may be a circuit or any apparatus configured to perform the functions recited by the aforementioned means.

Of course, in the above examples, the circuitry included in the processor 504 is merely provided as an example, and other means for carrying out the described functions may be included within various aspects of the present disclosure, including but not limited to the instructions stored in the computer-readable storage medium 506, or any other suitable apparatus or means described in any one of the FIGS. 1, 2, 3, and/or 8, and utilizing, for example, the processes and/or algorithms described herein in relation to FIGS. 9-14.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication using inter-band carrier aggregation at a user equipment (UE), comprising:
   determining to reduce a value of a measured configured maximum user equipment (UE) output power ($P_{UMAX}$);
   determining a priority order in which to change a value of a power management maximum power reduction (P-MPR) of each component carrier f of serving cell c having a non-zero granted transmission power;

reducing a transmitter output power of each carrier f of serving cell c having the non-zero granted transmission power according to the determined priority order by increasing a P-MPR of the carrier f of serving cell c;

determining an electromagnetic power density exposure level;

determining if the electromagnetic power density exposure level is at or below a predetermined maximum permissible exposure (MPE) level; and returning to reducing the transmitter output power if the electromagnetic power density exposure level is greater than the predetermined MPE level.

2. The method of wireless communication of claim 1, further comprising:

receiving an instruction from a scheduling entity that causes the user equipment (UE) to determine to reduce the value of the $P_{UMAX}$.

3. The method of claim 1, further comprising:
receiving the priority order from a scheduling entity.

4. The method of claim 1, further comprising:
detecting a configuration of the user equipment (UE) that requires a reduction of the value of $P_{UMAX}$.

5. The method of claim 4, further comprising:
detecting an indication of proximity of the user equipment (UE) to a surface as the configuration of the user equipment (UE) that requires the reduction of the value of $P_{UMAX}$.

6. The method of claim 5, wherein the surface is a human head or a human hand.

7. An apparatus for wireless communication, comprising:
means for determining to reduce a value of a measured configured maximum user equipment (UE) output power ($P_{UMAX}$);

means for determining a priority order in which to change a value of a power management maximum power reduction (P-MPR) of each component carrier f of serving cell c having a non-zero granted transmission;

means for reducing a transmitter output power of each carrier f of serving cell c having the non-zero granted transmission power according to the determined priority order by increasing a P-MPR of the carrier f of serving cell c;

means for determining an electromagnetic power density exposure level;

means for determining if the electromagnetic power density exposure level is at or below a predetermined maximum permissible exposure (MPE) level; and means for returning to reducing the transmitter output power if the electromagnetic power density exposure level is greater than the predetermined MPE level.

8. A non-transitory computer-readable medium storing computer-executable code, comprising code for causing a computer to:

determine to reduce a value of a measured configured maximum user equipment (UE) output power ($P_{UMAX}$);

determine a priority order in which to change a value of a power management maximum power reduction (P-MPR) of each component carrier f of serving cell c having a non-zero granted transmission power;

reduce a transmitter output power of each carrier f of serving cell c having the non-zero granted transmission power according to the determined priority order by increasing a P-MPR of the carrier f of serving cell c;

determine an electromagnetic power density exposure level;

determine if the electromagnetic power density exposure level is at or below a predetermined maximum permissible exposure (MPE) level; and return to reducing the transmitter output power if the electromagnetic power density exposure level is greater than the predetermined MPE level.

9. An apparatus for wireless communication, comprising:
a processor;
a transceiver communicatively coupled to the processor; and
a memory communicatively coupled to the processor,
wherein the processor is configured to:

determine to reduce a value of a measured configured maximum user equipment (UE) output power ($P_{UMAX}$);

determine a priority order in which to change a value of a power management maximum power reduction (P-MPR) of each component carrier f of serving cell c having a non-zero granted transmission power;

reduce a transmitter output power of each carrier f of serving cell c having the non-zero granted transmission power according to the determined priority order by increasing a P-MPR of the carrier f of serving cell c;

determine an electromagnetic power density exposure level;

determine if the electromagnetic power density exposure level is at or below a predetermined maximum permissible exposure (MPE) level; and return to reducing the transmitter output power if the electromagnetic power density exposure level is greater than the predetermined MPE level.

10. A method of wireless communication using inter-band carrier aggregation at a user equipment (UE), comprising:

determining to reduce a value of a measured configured maximum user equipment (UE) output power ($P_{UMAX}$);

determining a priority order of a plurality of types of uplink (UL) transmissions;

assigning a priority value to each type of UL transmission in accordance with the determined priority order;

reducing a transmitter output power associated with the given type of UL transmission during the given type of UL transmission by increasing a P-MPR according to the determined priority order;

determining an electromagnetic power density exposure level;

determining if the electromagnetic power density exposure level is at or below a predetermined maximum permissible exposure (MPE) level; and returning to reducing the transmitter output power if the electromagnetic power density exposure level is greater than the predetermined MPE level.

11. The method of wireless communication of claim 10, further comprising:

receiving an instruction from a scheduling entity that causes the user equipment (UE) to determine to reduce the value of the $P_{UMAX}$.

12. The method of claim 10, further comprising:
receiving the priority order from a scheduling entity.

13. The method of claim 10, further comprising:
detecting a configuration of the user equipment (UE) that requires a reduction of the value of $P_{UMAX}$.

14. The method of claim 13, further comprising:
detecting an indication of proximity of the user equipment (UE) to a surface as the configuration of the user equipment (UE) that requires the reduction of the value of $P_{UMAX}$.

15. The method of claim 14, wherein the surface is a human head or a human hand.

16. An apparatus for wireless communication, comprising:
   means for determining to reduce a value of a measured configured maximum user equipment (UE) output power ($P_{UMAX}$);
   means for determining a priority order of a plurality of types of uplink (UL) transmissions;
   means for assigning a priority value to each type of UL transmission in accordance with the determined priority order
   means for reducing a transmitter output power associated with the given type of UL transmission during the given type of UL transmission by increasing a P-MPR according to the determined priority order;
   means for determining an electromagnetic power density exposure level;
   means for determining if the electromagnetic power density exposure level is at or below a predetermined maximum permissible exposure (MPE) level; and
   means for returning to reducing the transmitter output power if the electromagnetic power density exposure level is greater than the predetermined MPE level.

17. A non-transitory computer-readable medium storing computer-executable code, comprising code for causing a computer to:
   determine to reduce a value of a measured configured maximum user equipment (UE) output power ($P_{UMAX}$);
   determine a priority order of a plurality of types of uplink (UL) transmissions;
   assign a priority value to each type of UL transmission in accordance with the determined priority order
   reduce a transmitter output power associated with the given type of UL transmission during the given type of UL transmission by increasing a P-MPR according to the determined priority order;
   determine an electromagnetic power density exposure level;
   determine if the electromagnetic power density exposure level is at or below a predetermined maximum permissible exposure (MPE) level; and
   return to reducing the transmitter output power if the electromagnetic power density exposure level is greater than the predetermined MPE level.

18. An apparatus for wireless communication, comprising:
   a processor;
   a transceiver communicatively coupled to the processor; and
   a memory communicatively coupled to the processor, wherein the processor is configured to:
      determine to reduce a value of a measured configured maximum user equipment (UE) output power ($P_{UMAX}$);
      determine a priority order of a plurality of types of uplink (UL) transmissions;
      assign a priority value to each type of UL transmission in accordance with the determined priority order
      reduce a transmitter output power associated with the given type of UL transmission during the given type of UL transmission by increasing a P-MPR according to the determined priority order;
      determine an electromagnetic power density exposure level;
      determine if the electromagnetic power density exposure level is at or below a predetermined maximum permissible exposure (MPE) level; and
      return to reducing the transmitter output power if the electromagnetic power density exposure level is greater than the predetermined MPE level.

19. A method of wireless communication using inter-band carrier aggregation at a user equipment (UE), comprising:
   determining to reduce a value of a measured configured maximum user equipment (UE) output power ($P_{UMAX}$);
   selecting a first UL channel from a first PUCCH group of a PUCCH having a plurality of PUCCH groups and a second UL channel from a second PUCCH group of the PUCCH having the plurality of PUCCH groups;
   determining if a first service-priority (S-pri) value of the first UL channel is higher than a second S-pri value of the second UL channel;
   giving a higher priority for transmission to that one of the first UL channel or the second UL channel that has a highest S-pri value;
   reducing a transmitter output power associated with the higher priority UL channel by increasing a P-MPR associated with the higher priority UL channel;
   determining an electromagnetic power density exposure level;
   determining if the electromagnetic power density exposure level is at or below a predetermined maximum permissible exposure (MPE) level; and
   returning to reducing the transmitter output power if the electromagnetic power density exposure level is greater than the predetermined MPE level.

20. The method of wireless communication of claim 19, further comprising:
   receiving an instruction from a scheduling entity that causes the user equipment (UE) to determine to reduce the value of the $P_{UMAX}$.

21. The method of claim 19, further comprising:
   receiving the priority order from a scheduling entity.

22. The method of claim 19, further comprising:
   detecting a configuration of the user equipment (UE) that requires a reduction of the value of $P_{UMAX}$.

23. The method of claim 22, further comprising:
   detecting an indication of proximity of the user equipment (UE) to a surface as the configuration of the user equipment (UE) that requires the reduction of the value of $P_{UMAX}$.

24. The method of claim 23, wherein the surface is a human head or a human hand.

25. The method of claim 19, further comprising:
   determining if a first channel-priority (C-pri) value of the first UL channel is higher than a second C-pri value of the second UL channel when the first S-pri value is equal to the second S-pri value, and
   giving the higher priority for transmission to that one of the first UL channel or the second UL channel that has the highest C-pri value when the first S-pri value is equal to the second S-pri value.

26. An apparatus for wireless communication, comprising:
   means for determining to reduce a value of a measured configured maximum user equipment (UE) output power ($P_{UMAX}$);
   means for selecting a first UL channel from a first PUCCH group of a PUCCH having a plurality of PUCCH groups and a second UL channel from a second PUCCH group of the PUCCH having the plurality of PUCCH groups;

means for determining if a first service-priority (S-pri) value of the first UL channel is higher than a second S-pri value of the second UL channel;

means for giving a higher priority for transmission to that one of the first UL channel or the second UL channel that has a highest S-pri value;

means for reducing a transmitter output power associated with the higher priority UL channel by increasing a P-MPR associated with the higher priority UL channel;

means for determining an electromagnetic power density exposure level;

means for determining if the electromagnetic power density exposure level is at or below a predetermined maximum permissible exposure (MPE) level; and means for returning to reducing the transmitter output power if the electromagnetic power density exposure level is greater than the predetermined MPE level.

27. A non-transitory computer-readable medium storing computer-executable code, comprising code for causing a computer to:

determine to reduce a value of a measured configured maximum user equipment (UE) output power ($P_{UMAX}$);

select a first UL channel from a first PUCCH group of a PUCCH having a plurality of PUCCH groups and a second UL channel from a second PUCCH group of the PUCCH having the plurality of PUCCH groups;

determine if a first service-priority (S-pri) value of the first UL channel is higher than a second S-pri value of the second UL channel;

give a higher priority for transmission to that one of the first UL channel or the second UL channel that has a highest S-pri value;

reduce a transmitter output power associated with the higher priority UL channel by increasing a P-MPR associated with the higher priority UL channel;

determine an electromagnetic power density exposure level;

determine if the electromagnetic power density exposure level is at or below a predetermined maximum permissible exposure (MPE) level; and return to reducing the transmitter output power if the electromagnetic power density exposure level is greater than the predetermined MPE level.

28. An apparatus for wireless communication, comprising:

a processor;

a transceiver communicatively coupled to the processor; and a memory communicatively coupled to the processor, wherein the processor is configured to:

determine to reduce a value of a measured configured maximum user equipment (UE) output power ($P_{UMAX}$);

select a first UL channel from a first PUCCH group of a PUCCH having a plurality of PUCCH groups and a second UL channel from a second PUCCH group of the PUCCH having the plurality of PUCCH groups;

determine if a first service-priority (S-pri) value of the first UL channel is higher than a second S-pri value of the second UL channel;

give a higher priority for transmission to that one of the first UL channel or the second UL channel that has a highest S-pri value;

reduce a transmitter output power associated with the higher priority UL channel by increasing a P-MPR associated with the higher priority UL channel;

determine an electromagnetic power density exposure level;

determine if the electromagnetic power density exposure level is at or below a predetermined maximum permissible exposure (MPE) level; and return to reducing the transmitter output power if the electromagnetic power density exposure level is greater than the predetermined MPE level.

29. A method of wireless communication using inter-band carrier aggregation at a user equipment (UE), comprising:

determining to reduce a value of a measured configured maximum user equipment (UE) output power ($P_{UMAX}$);

selecting a first UL channel from a first PUCCH group of a PUCCH having a plurality of PUCCH groups and a second UL channel from a second PUCCH group of the PUCCH having the plurality of PUCCH groups;

determining if a first channel-priority (C-pri) value of the first UL channel is higher than a second C-pri value of the second UL channel;

giving a higher priority for transmission to that one of the first UL channel or the second UL channel that has a highest C-pri value;

reducing a transmitter output power associated with the higher priority UL channel by increasing a P-MPR associated with the higher priority UL channel;

determining an electromagnetic power density exposure level;

determining if the electromagnetic power density exposure level is at or below a predetermined maximum permissible exposure (MPE) level; and returning to reducing the transmitter output power if the electromagnetic power density exposure level is greater than the predetermined MPE level.

30. The method of wireless communication of claim 29, further comprising:

receiving an instruction from a scheduling entity that causes the user equipment (UE) to determine to reduce the value of the $P_{UMAX}$.

31. The method of claim 29, further comprising:
receiving the priority order from a scheduling entity.

32. The method of claim 29, further comprising:
detecting a configuration of the user equipment (UE) that requires a reduction of the value of $P_{UMAX}$.

33. The method of claim 32, further comprising:
detecting an indication of proximity of the user equipment (UE) to a surface as the configuration of the user equipment (UE) that requires the reduction of the value of $P_{UMAX}$.

34. The method of claim 33, wherein the surface is a human head or a human hand.

35. The method of claim 29, further comprising:
determining if a first service-priority (S-pri) value of the first UL channel is higher than a second S-pri value of the second UL channel when the first channel-priority (C-pri) value of the first UL channel is equal to the second C-pri value of the second UL channel, and giving the higher priority for transmission to that one of the first UL channel or the second UL channel that has a highest S-pri value when the first C-pri value is equal to the second C-pri value.

36. An apparatus for wireless communication, comprising:

means for determining to reduce a value of a measured configured maximum user equipment (UE) output power ($P_{UMAX}$);

means for selecting a first UL channel from a first PUCCH group of a PUCCH having a plurality of PUCCH groups and a second UL channel from a second PUCCH group of the PUCCH having the plurality of PUCCH groups;
means for determining if a first channel-priority (C-pri) value of the first UL channel is higher than a second C-pri value of the second UL channel;
means for giving a higher priority for transmission to that one of the first UL channel or the second UL channel that has a highest C-pri value;
means for reducing a transmitter output power associated with the higher priority UL channel by increasing a P-MPR associated with the higher priority UL channel;
means for determining an electromagnetic power density exposure level;
means for determining if the electromagnetic power density exposure level is at or below a predetermined maximum permissible exposure (MPE) level; and
means for returning to reducing the transmitter output power if the electromagnetic power density exposure level is greater than the predetermined MPE level.

37. A non-transitory computer-readable medium storing computer-executable code, comprising code for causing a computer to:
determine to reduce a value of a measured configured maximum user equipment (UE) output power ($P_{UMAX}$);
select a first UL channel from a first PUCCH group of a PUCCH having a plurality of PUCCH groups and a second UL channel from a second PUCCH group of the PUCCH having the plurality of PUCCH groups;
determine if a first channel-priority (C-pri) value of the first UL channel is higher than a second C-pri value of the second UL channel;
give a higher priority for transmission to that one of the first UL channel or the second UL channel that has a highest C-pri value;
reduce a transmitter output power associated with the higher priority UL channel by increasing a P-MPR associated with the higher priority UL channel;
determine an electromagnetic power density exposure level;
determine if the electromagnetic power density exposure level is at or below a predetermined maximum permissible exposure (MPE) level; and
return to reducing the transmitter output power if the electromagnetic power density exposure level is greater than the predetermined MPE level.

38. An apparatus for wireless communication, comprising:
a processor;
a transceiver communicatively coupled to the processor; and
a memory communicatively coupled to the processor, wherein the processor is configured to:
determine to reduce a value of a measured configured maximum user equipment (UE) output power ($P_{UMAX}$);
select a first UL channel from a first PUCCH group of a PUCCH having a plurality of PUCCH groups and a second UL channel from a second PUCCH group of the PUCCH having the plurality of PUCCH groups;
determine if a first channel-priority (C-pri) value of the first UL channel is higher than a second C-pri value of the second UL channel;
give a higher priority for transmission to that one of the first UL channel or the second UL channel that has a highest C-pri value;
reduce a transmitter output power associated with the higher priority UL channel by increasing a P-MPR associated with the higher priority UL channel;
determine an electromagnetic power density exposure level;
determine if the electromagnetic power density exposure level is at or below a predetermined maximum permissible exposure (MPE) level; and
return to reducing the transmitter output power if the electromagnetic power density exposure level is greater than the predetermined MPE level.

* * * * *